US009389751B2

(12) United States Patent
Ohta

(10) Patent No.: US 9,389,751 B2
(45) Date of Patent: Jul. 12, 2016

(54) STORAGE MEDIUM STORING SUBJECT SELECTING PROGRAM AND SUBJECT SELECTING APPARATUS

(75) Inventor: Keizo Ohta, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 1378 days.

(21) Appl. No.: 11/521,386

(22) Filed: Sep. 15, 2006

(65) Prior Publication Data

US 2007/0191112 A1 Aug. 16, 2007

(30) Foreign Application Priority Data

Feb. 7, 2006 (JP) .................................. 2006-029918

(51) Int. Cl.
G06F 3/0482 (2013.01)
G06F 3/0346 (2013.01)

(52) U.S. Cl.
CPC ............ G06F 3/0482 (2013.01); G06F 3/0346 (2013.01); *A63F 2300/105* (2013.01)

(58) Field of Classification Search
USPC ............. 710/1–74; 707/1–104; 463/1–43, 48; 345/156–184
See application file for complete search history.

(56) References Cited

U.S. PATENT DOCUMENTS

| 5,309,137 | A | 5/1994 | Kajiwara |
| 5,319,387 | A | 6/1994 | Yoshikawa |
| 5,543,818 | A * | 8/1996 | Scott .............................. 345/168 |
| 5,554,980 | A | 9/1996 | Hashimoto et al. |
| 5,574,479 | A | 11/1996 | Odell |
| 5,627,565 | A | 5/1997 | Morishita et al. |
| 5,956,021 | A * | 9/1999 | Kubota et al. ................. 345/179 |
| 5,990,890 | A * | 11/1999 | Etheredge ...................... 715/808 |
| 6,084,576 | A * | 7/2000 | Leu et al. ....................... 345/168 |
| 6,144,378 | A * | 11/2000 | Lee ................................ 715/767 |
| 6,593,913 | B1 * | 7/2003 | Krohn et al. .................. 345/168 |
| 6,801,659 | B1 * | 10/2004 | O'Dell .......................... 382/185 |
| 6,982,697 | B2 | 1/2006 | Wilson et al. |
| 7,058,900 | B2 * | 6/2006 | Sugano .......................... 715/773 |
| 7,139,983 | B2 | 11/2006 | Kelts |
| 7,158,118 | B2 * | 1/2007 | Liberty .......................... 345/158 |
| 7,171,498 | B2 * | 1/2007 | Tu et al. .......................... 710/73 |
| 7,262,760 | B2 | 8/2007 | Liberty |
| 7,292,151 | B2 | 11/2007 | Ferguson et al. |

(Continued)

FOREIGN PATENT DOCUMENTS

| JP | 7-284166 | 10/1995 |
| JP | 2000-305704 | 11/2000 |

(Continued)

OTHER PUBLICATIONS

Zeus, LinksBoks .92 'Dr. Zoidberg Edition'; Jun. 13, 2004; pp. 1-8.*

(Continued)

*Primary Examiner* — Patrick F Marinelli
(74) *Attorney, Agent, or Firm* — Nixon & Vanderhye P.C.

(57) ABSTRACT

A plurality of selection subjects which are divided into groups under a predetermined condition are displayed on a display screen. One group is selected based on coordinate information output from a pointing device. Next, based on an operation signal output from an input device which outputs an operation signal of a plurality of types of operation signals, depending on a player's operation, one is selected from the selection subjects belonging to the group, and a process is performed, depending on the selected selection subject.

26 Claims, 29 Drawing Sheets

(56) References Cited

U.S. PATENT DOCUMENTS

| | | | |
|---|---|---|---|
| 7,414,611 | B2 | 8/2008 | Liberty |
| 7,545,956 | B2 | 6/2009 | Miyahara |
| 7,600,192 | B1 | 10/2009 | Hashimoto et al. |
| 7,672,543 | B2 | 3/2010 | Hull et al. |
| 7,868,787 | B2 * | 1/2011 | Chung et al. ............... 341/33 |
| 2002/0156615 | A1 * | 10/2002 | Takatsuka et al. ........... 704/1 |
| 2004/0139254 | A1 | 7/2004 | Tu et al. |
| 2004/0174340 | A1 | 9/2004 | Bruneau et al. |
| 2005/0052415 | A1 | 3/2005 | Braun et al. |
| 2005/0137774 | A1 | 6/2005 | Rupp |
| 2005/0244034 | A1 | 11/2005 | Miyahara |
| 2007/0117625 | A1 * | 5/2007 | Marks et al. ............... 463/30 |
| 2007/0211027 | A1 | 9/2007 | Ohta |

FOREIGN PATENT DOCUMENTS

| | | |
|---|---|---|
| JP | 2002-222039 | 8/2002 |
| WO | WO0033571 | 6/2000 |
| WO | WO 2004099903 | 11/2004 |

OTHER PUBLICATIONS ysboks, Linksboks Release .99 'Marmitopter Edition'; Apr. 17, 2005; pp. 1-13.*

ADXL202 Specification Sheet: Low Cost ±2 g Dual Axis i MEMs® Accelerometer with Digital Output; Analog Devices, Inc., 1998.

ADXL330 Specification Sheet: Small, Low Power, 3-Axis ±3 g i MEMs® Accelerometer; Analog Devices, Inc., 2007.

Pictures of Microsoft Xwand retrieved on May 13, 2009 from http://www.kf12.com/blogs/uploads/xwand/xwand.jpg and http://www.cs.cmu.edu/%7Edwilson/images/xwand.jpg.

Wilson, Andrew D., et al.; "Demonstration of the XWand Interface for Intelligent Spaces"; Microsoft Research; UIST '02 Companion; pp. 37-38.

Wilson, Daniel, et al.; "Gesture Recognition Using the XWand"; Robotics Institute; Carnegie Mellon University; tech report CMU-RI-TR-04-57; Apr. 2004.

Wilson, Andy, "XWand: UI for Intelligent Environments"; Apr. 26, 2004; retrieved May 12, 2009 from http://research.microsoft.com/en-us/um/people/awilson/wand/default.htm.

Wilson, Andrew, et al.; "XWand: UI for Intelligent Spaces"; Microsoft Research; CHI 2003, Apr. 5-10, 2003; Ft. Lauderdale, FL.

Selectech Air Mouse, Description; retrieved on May 5, 2009 from http://cgi.ebay.com.my/ws/eBayISAPI.dll?ViewItem&item=350096666675&indexURL.

Machine translation of Patent Abstract of Japan for Publication No. 11-305935 published May 11, 1999, Sakai Masaru, Ura Shigenori "Position Detection System", Application No. 10-153534, pp. 1-15.

Office Action dated May 26, 2010 in related U.S. Appl. No. 11/545,444.

Jul. 31, 2012, Search Report for EP 06019260.6, 6 pages.

* cited by examiner

F I G. 1
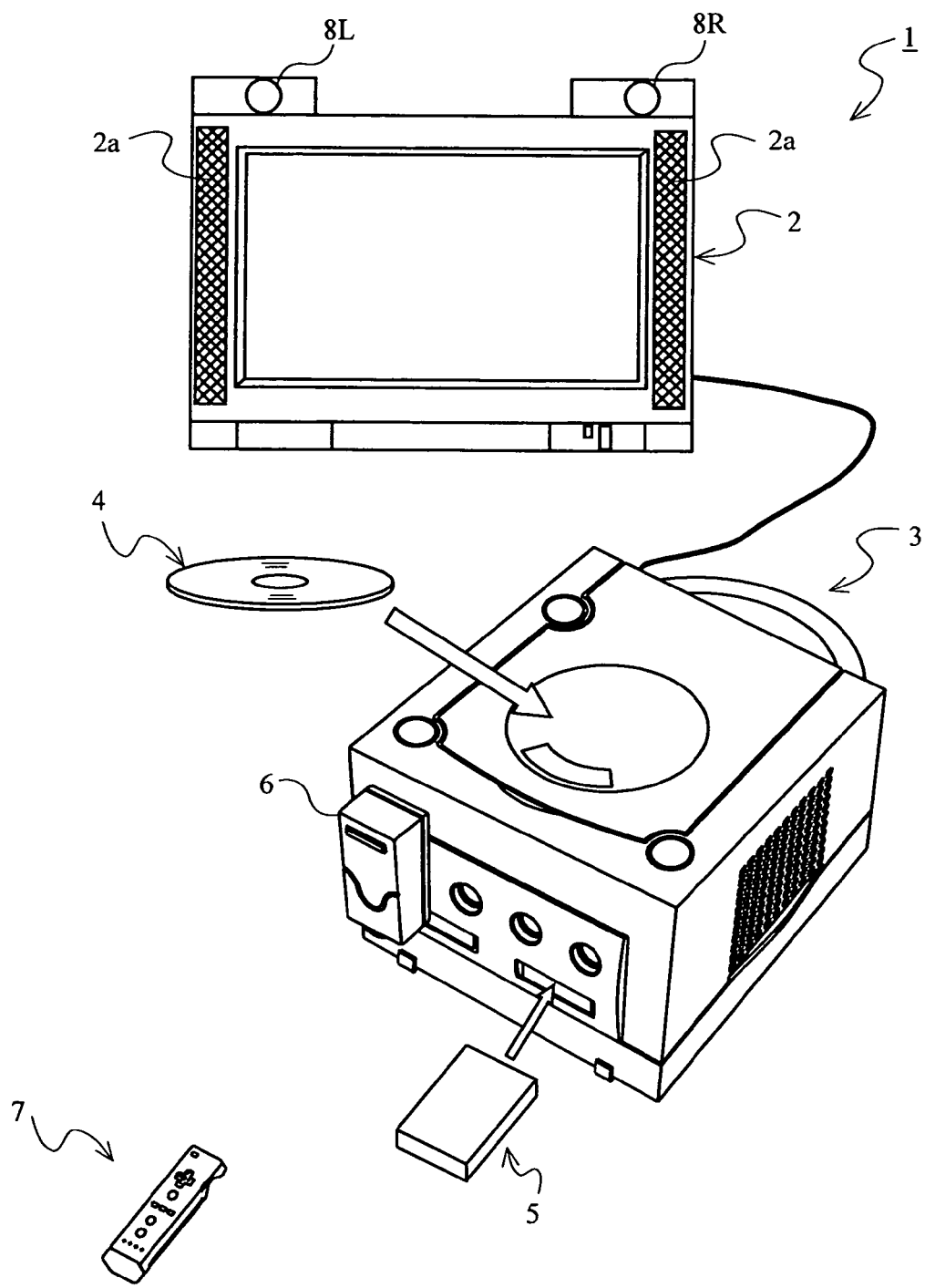

F I G. 4
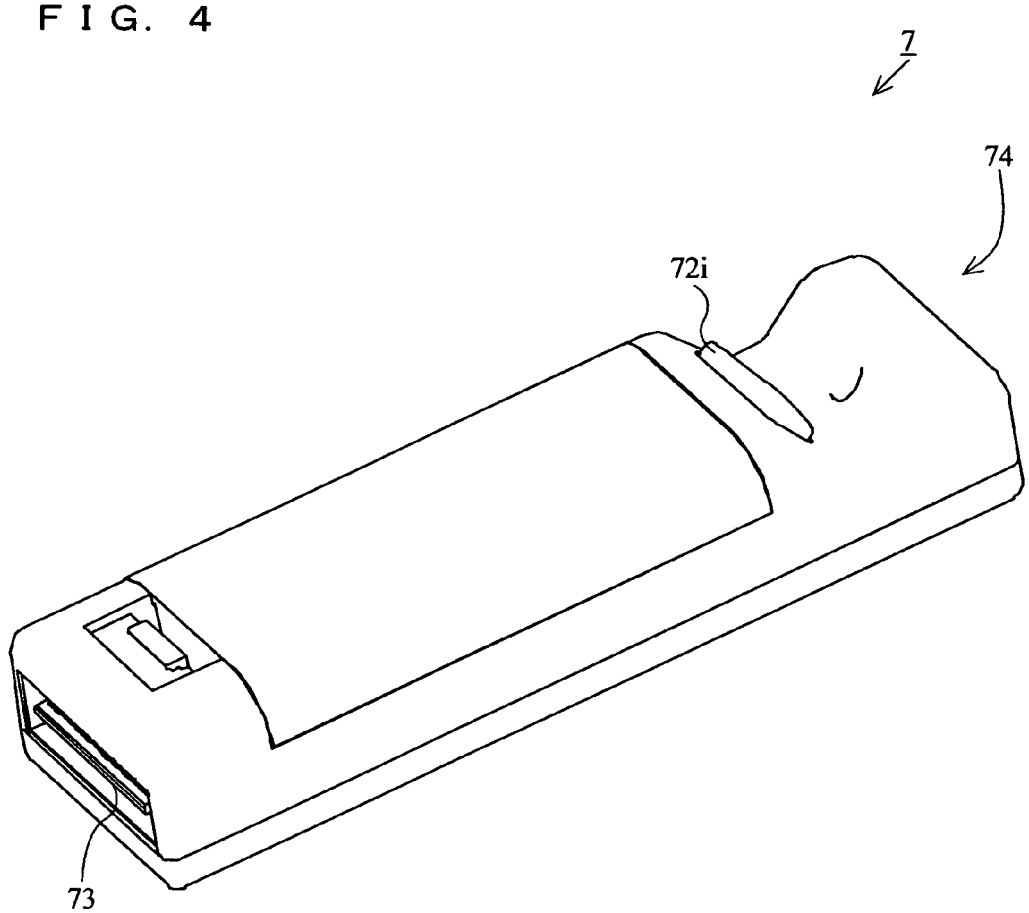

F I G. 8
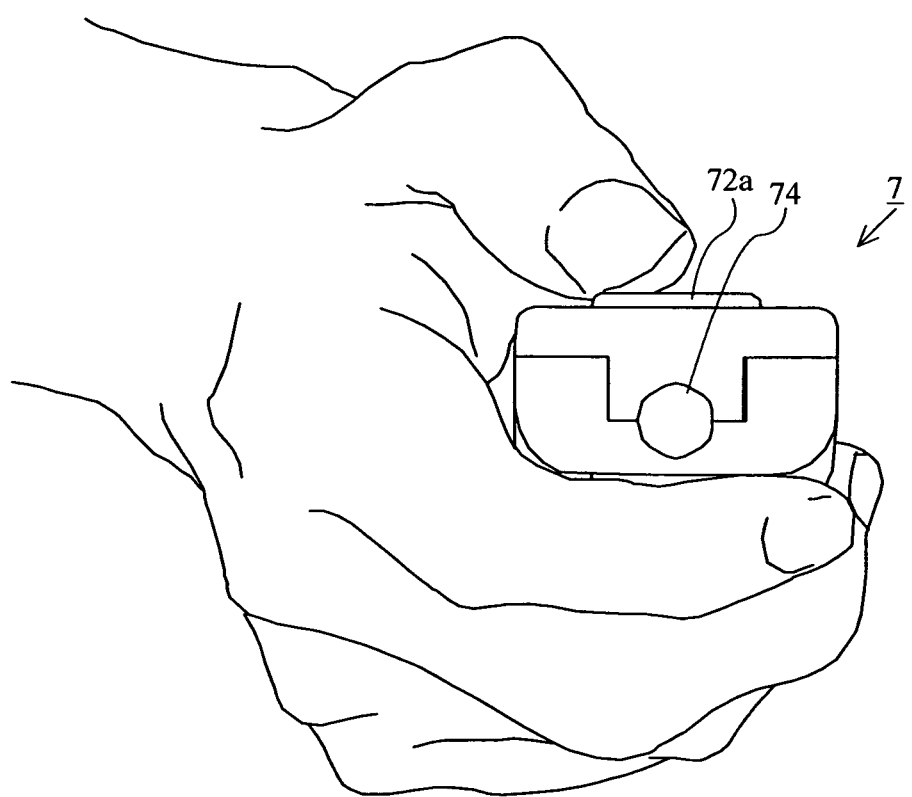

F I G. 1 4
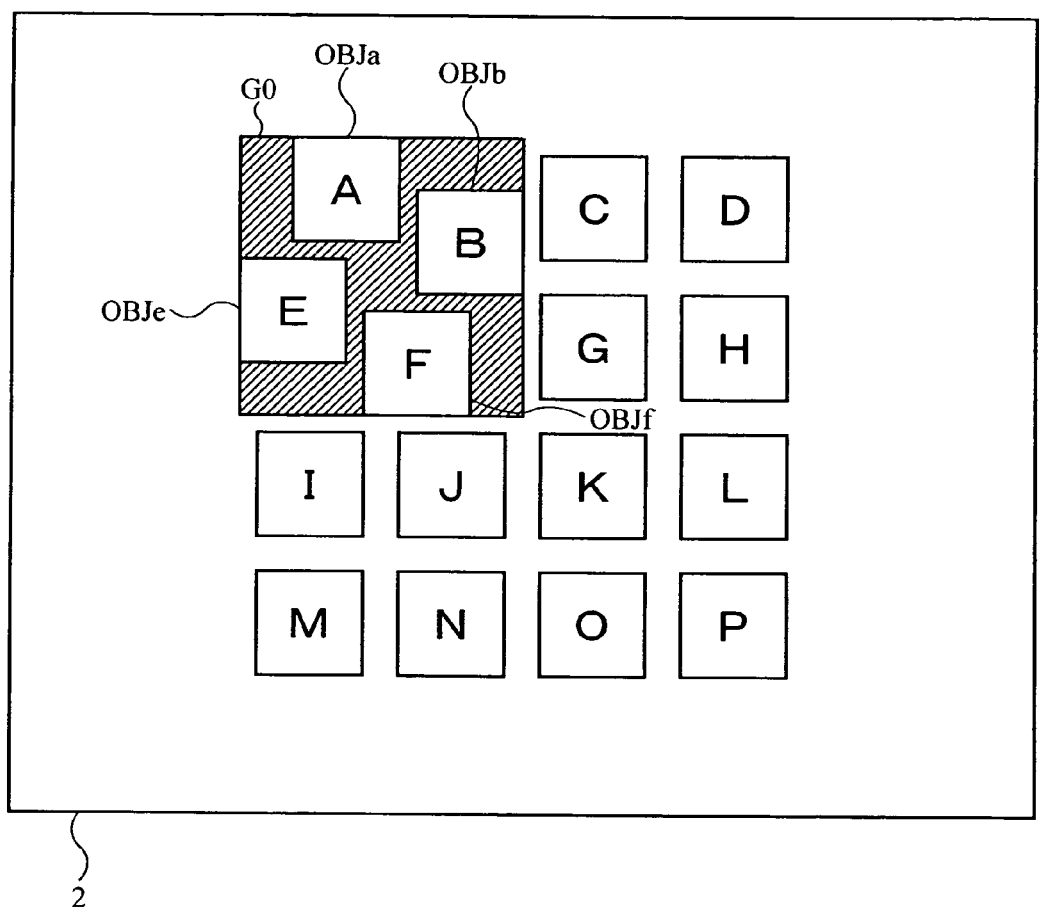

F I G. 1 5
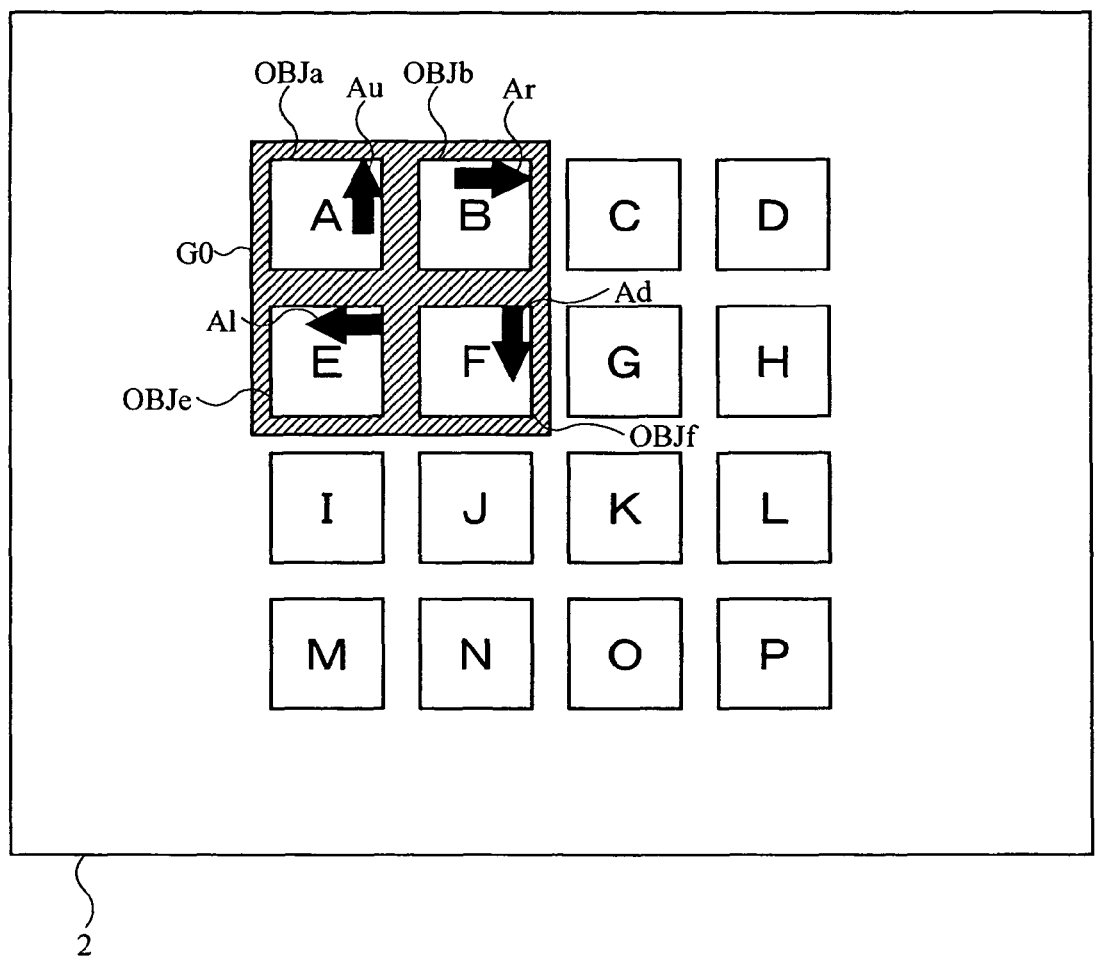

F I G. 1 6
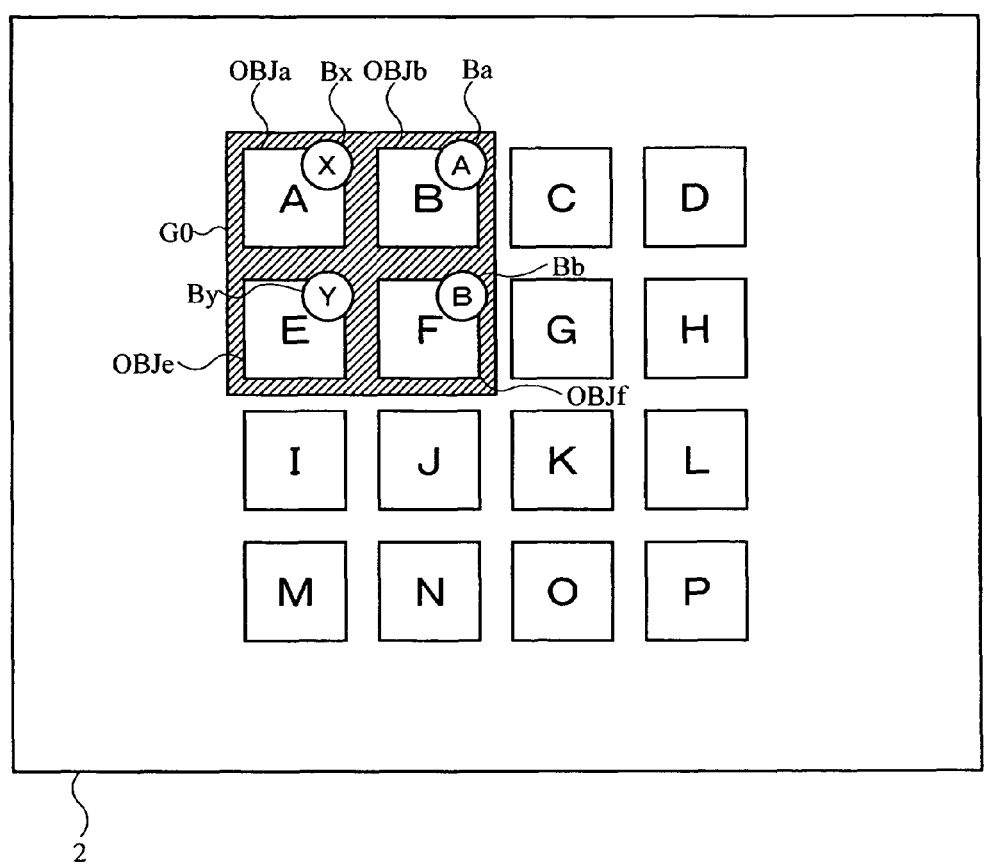

F I G. 1 7
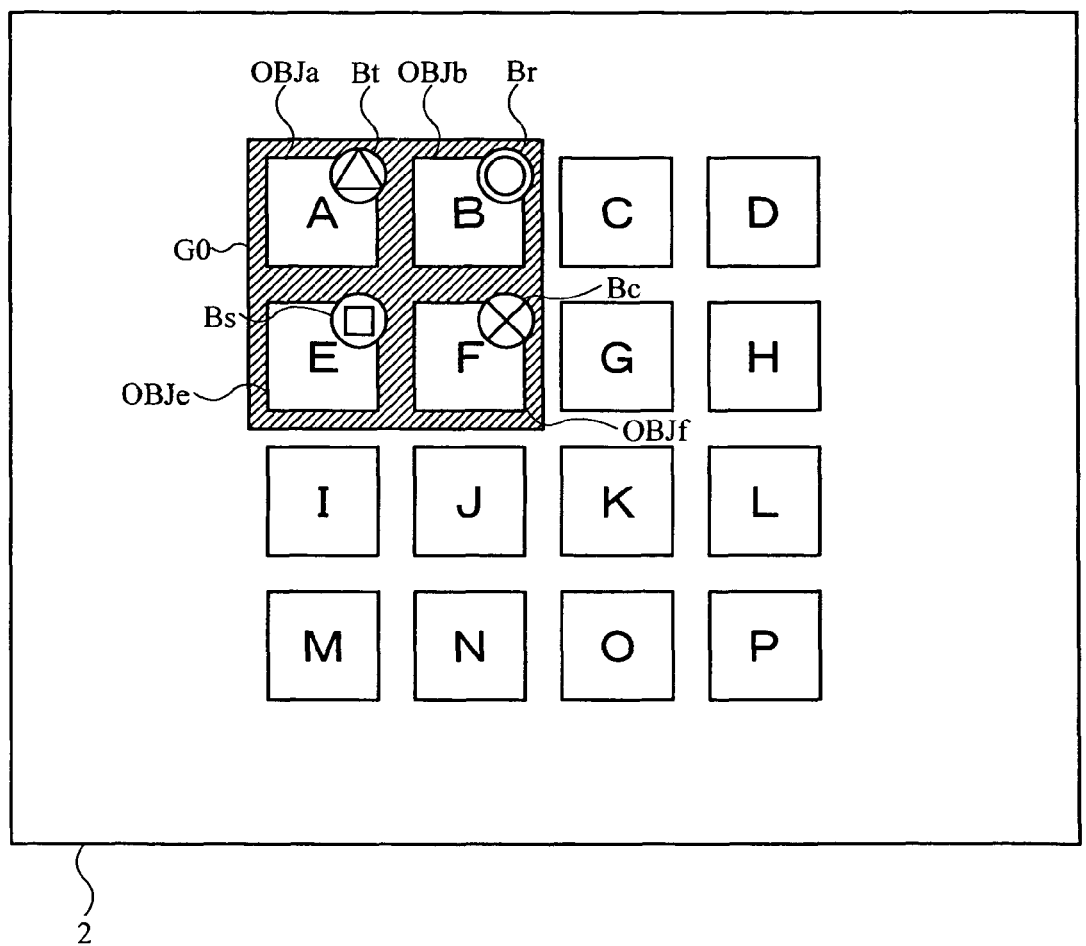

F I G. 1 8
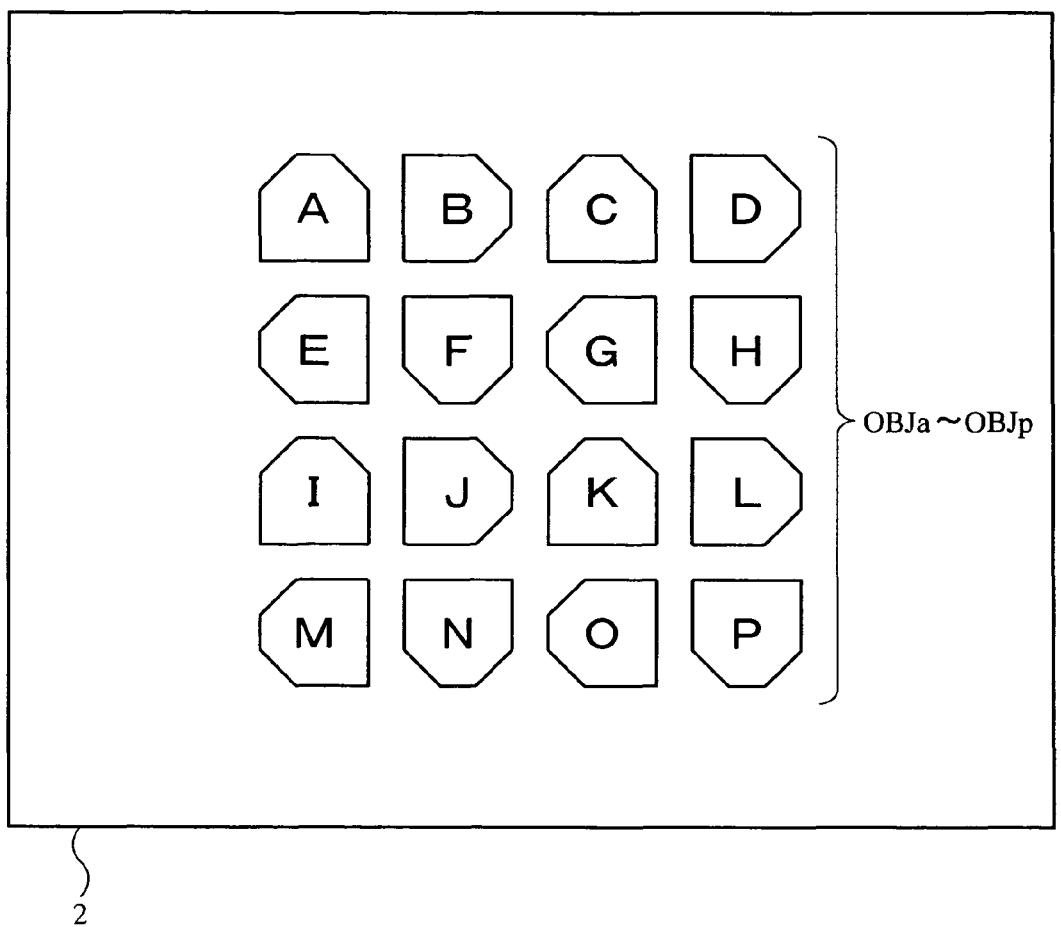

F I G. 1 9
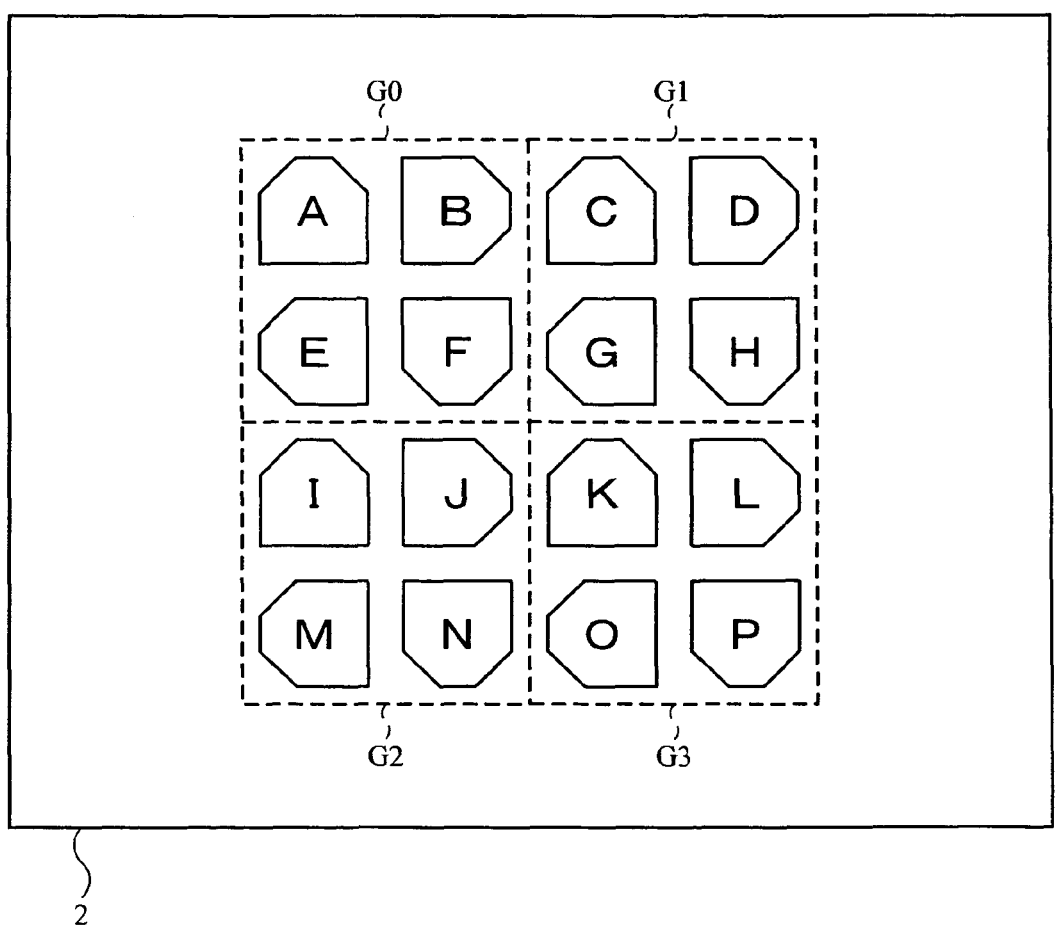

F I G. 2 0
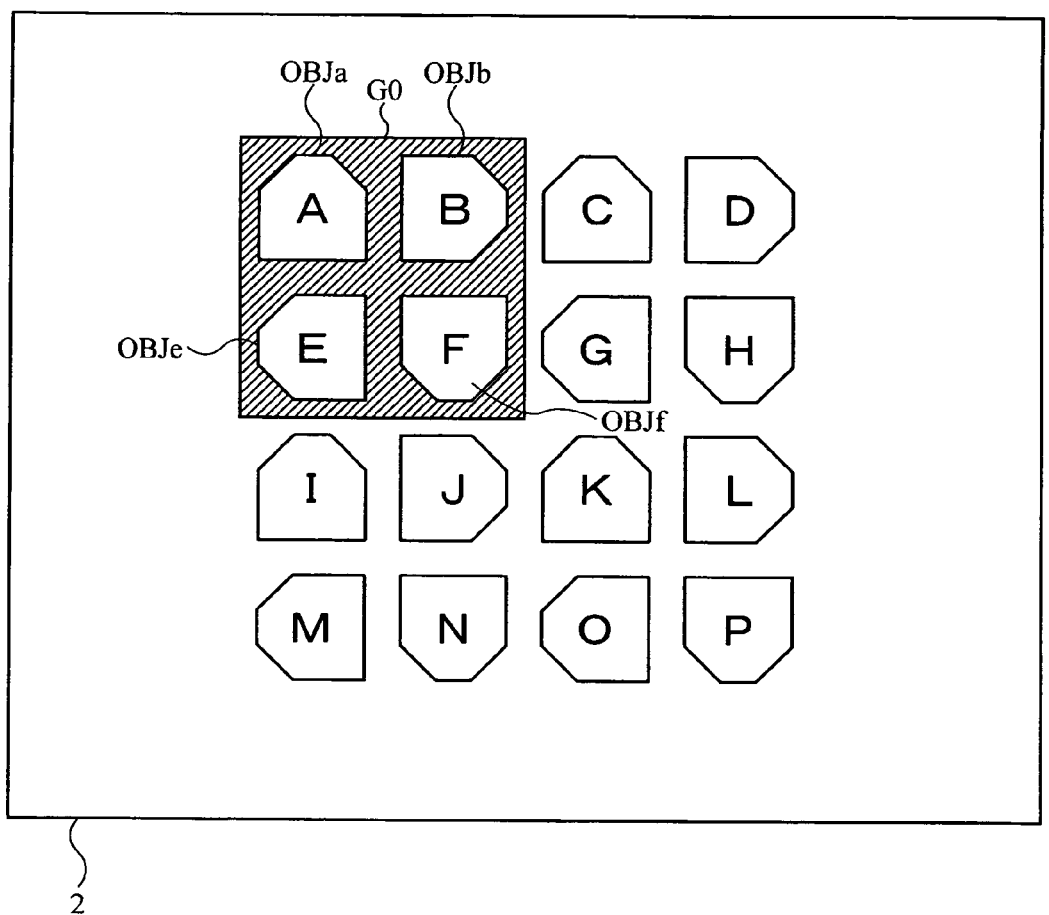

F I G. 23

| KEY CHARACTER | A | B | C | D | E | F | G | H | I | J | K | L | M | N | O | P |
|---|---|---|---|---|---|---|---|---|---|---|---|---|---|---|---|---|
| KEY NUMBER kn | 0 | 1 | 2 | 3 | 4 | 5 | 6 | 7 | 8 | 9 | 10 | 11 | 12 | 13 | 14 | 15 |

FIG. 24

| ADDRESS NUMBER tb | KEY NUMBER kn | KEY CHARACTER | GROUP NUMBER gn | CONTROLLER OPERATION NUMBER cn |
|---|---|---|---|---|
| 0 | 0 | A | 0 | 0 |
| 1 | 1 | B | 0 | 1 |
| 2 | 4 | E | 0 | 2 |
| 3 | 5 | F | 0 | 3 |
| 4 | 2 | C | 1 | 0 |
| 5 | 3 | D | 1 | 1 |
| 6 | 6 | G | 1 | 2 |
| 7 | 7 | H | 1 | 3 |
| 8 | 8 | I | 2 | 0 |
| 9 | 9 | J | 2 | 1 |
| 10 | 12 | M | 2 | 2 |
| 11 | 13 | N | 2 | 3 |
| 12 | 10 | K | 3 | 0 |
| 13 | 11 | L | 3 | 1 |
| 14 | 14 | O | 3 | 2 |
| 15 | 15 | P | 3 | 3 |

F I G. 2 6
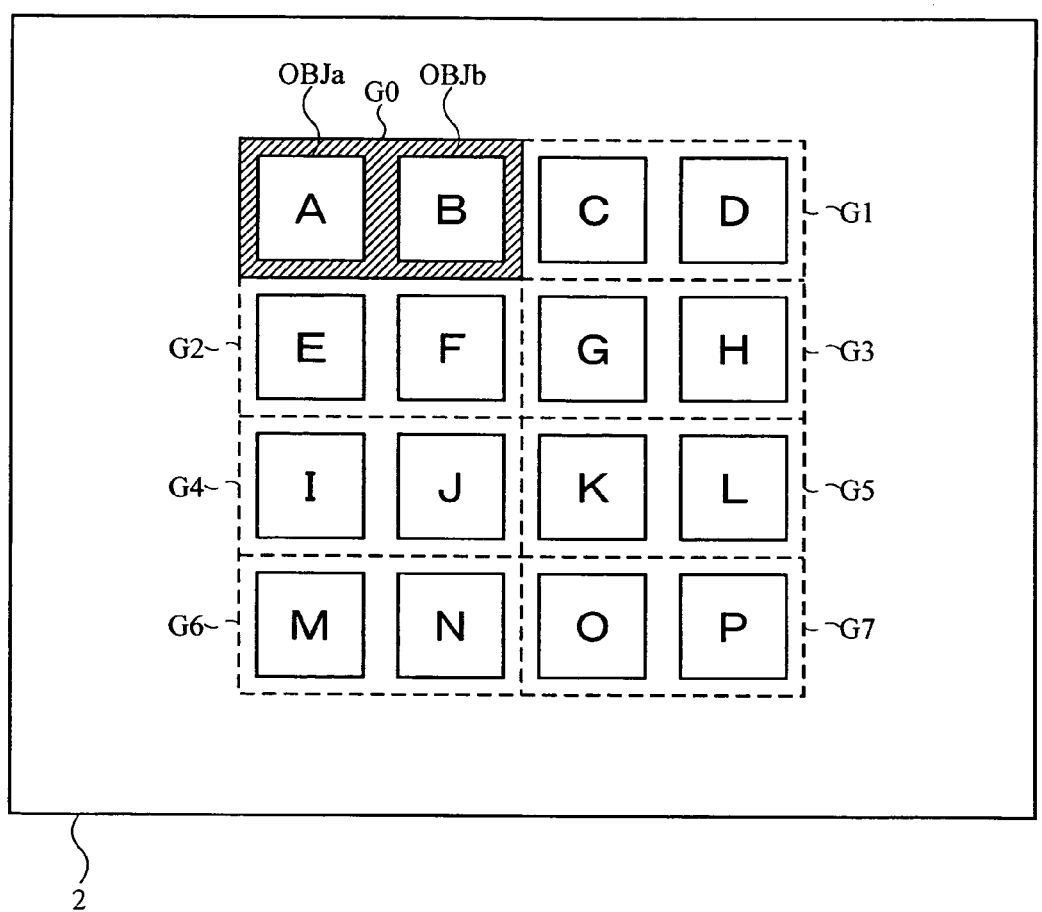

F I G. 2 7
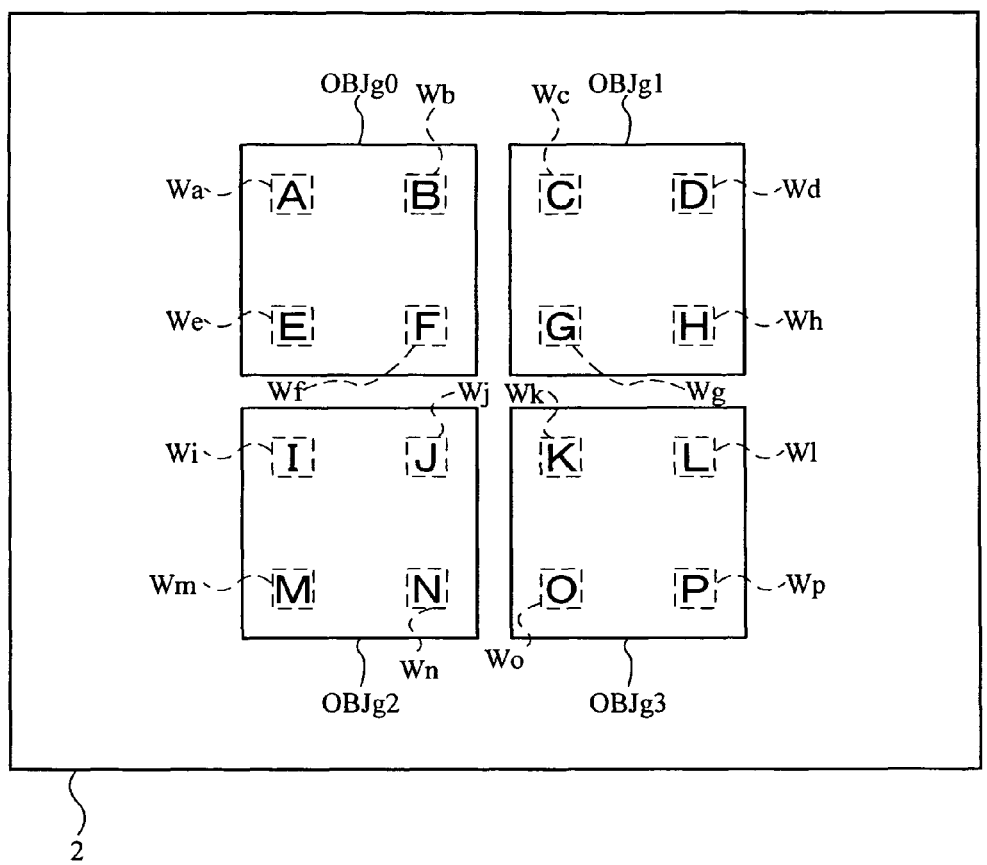

STORAGE MEDIUM STORING SUBJECT SELECTING PROGRAM AND SUBJECT SELECTING APPARATUS

CROSS REFERENCE TO RELATED APPLICATION

The disclosure of Japanese Patent Application No. 2006-029918, filed Feb. 7, 2006, is incorporated herein by reference.

TECHNICAL FIELD

The exemplary embodiments disclosed herein relate to a storage medium storing a subject selecting program, and a subject selecting apparatus. More particularly, the exemplary embodiments disclosed herein relate to a subject selecting apparatus for selecting from a plurality of selection subjects displayed on a display device using a pointing device, and a storage medium storing a subject selecting program which is executed by a computer of the subject selecting apparatus.

BACKGROUND AND SUMMARY

Conventionally, as disclosed in, for example, Japanese Patent Laid-Open Publication No. 2002-222039 (hereinafter referred to as Patent Document 1), there is a technique of selecting from selection subjects displayed on a display device. In an apparatus disclosed in Patent Document 1, after one is selected from a plurality of groups into which a plurality of pieces of information are divided in accordance with a predetermined rule, one is selected from a plurality of pieces of information included in the selected group. Thus, by dividing a plurality of pieces of information into groups, a two-step selection operation can be performed, thereby making it possible to reduce a time required to select information (e.g., to shift a cursor, etc.) as compared to when all pieces of information are selectable.

In the apparatus disclosed in Patent Document 1, when a cursor is shifted using a direction key or the like of a controller for a video game machine, the number of operation steps required to shift the cursor to desired information can be reduced by the two-step selection operation as compared to when all pieces of information are selectable. However, when information is selected using a pointing device (e.g., a mouse, a touch panel, etc.), which outputs input coordinates based on a screen coordinate system of a display device, depending a user's operation, a user can directly select desired information. Therefore, when a pointing device is used, the operability of selecting grouped information is not different from when all pieces of information are selectable. Rather, the two-step operation may be more inefficient.

Therefore, a feature of certain exemplary embodiments is to provide a storage medium storing a subject selecting program which achieves accurate selection with higher operation efficiency when a pointing device is used to select from a plurality of selection subjects displayed on a display screen, and a subject selecting apparatus.

Certain exemplary embodiments have the following aspects to attain the feature mentioned above. Note that reference numerals, step numbers ("step" is abbreviated as "S", which is prefixed to step numbers), figure numbers, and the like inside parentheses indicate correspondence to certain exemplary embodiments described below for the sake of easy understanding, and do not restrict the certain exemplary embodiments.

A first aspect of certain exemplary embodiments is directed to a storage medium storing a subject selecting program which causes a computer (30) of an apparatus for performing a process of selecting one from a plurality of selection subjects (OBJa to OBJp, Wa to Wp) displayed on a display screen (2) using a pointing device (74) for outputting coordinate information (Da1, Da2) based on a predetermined coordinate system, depending on a player's operation, and an input device (72) for outputting a predetermined operation signal (Da3) of a plurality of types of operation signals, depending on a player's operation. The program causes the computer to execute a selection subject display control step (S50), a first operation information obtaining step (S51), a group selecting step (S53), a second operation information obtaining step (S57 to S59), a subject selecting step (S61), and a processing step. The selection subject display control step displays, on the display screen, a plurality of selection subjects which are divided into groups (G0 to G3 in FIGS. 12 and 19, G0 to G7 in FIG. 26, and OBJg0 to OBJg3 in FIG. 27) under a predetermined condition. The first operation information obtaining step obtains coordinate information output from the pointing device. The group selecting step selects one (selected group G) from the groups into which the plurality of selection subjects are divided, based on the coordinate information obtained in the first operation information obtaining step. The second operation information obtaining step obtains an operation signal output from the input device after the group is selected in the group selecting step. The subject selecting step selects one from selection subjects belonging to the group selected in the group selecting step, based on the operation signal obtained in the second operation information obtaining step. The processing step performs a process (a process employing kn), depending on the selection subject selected in the subject selecting step.

In a second aspect based on the first aspect, in the group selecting step, the coordinate information output from the pointing device is converted into coordinates in a screen coordinate system provided on the display screen, and one group displayed at a position having the coordinates on the display screen is selected from the groups into which the plurality of selection subjects are divided.

According to a third aspect based on the first aspect, in the subject selecting step, one selection subject displayed in a shape or at a position mimicking an installed position of an input section of the input device (an upward, downward, leftward and rightward shape, a lateral installed position or the like of a cross key 72a) which outputs the operation signal obtained in the second operation information obtaining step, is selected from the selection subjects belonging to the group selected in the group selecting step.

In a fourth aspect based on the third aspect, the group selecting step includes a selection subject display position change control step (S55). The selection subject display position change control step, when a group is selected, changes selection subjects belonging to the selected group into shapes or positions mimicking installed positions of input sections of the input device, and displays the resultant selection subjects on the display screen.

In a fifth aspect based on the first aspect the group selecting step includes a sign display addition control step (S55). The sign display addition control step, when a group is selected, assigns signs indicating functions assigned to respective input sections of the input device, to the respective selection subjects belonging to the selected group, and displays the selection subjects. In the subject selecting step, one selection subject displayed, being assigned a sign indicating a function assigned to an input section of the input device which outputs the operation signal obtained in the second operation information obtaining step, is selected from the selection subjects belonging to the group selected in the group selecting step.

In a sixth aspect based on the first aspect, the group selecting step includes a selected group display control step (S55). The selected group display control step, when a group is selected, displays selection subjects belonging to the selected group on the display screen while distinguishing the selection subjects belonging to the selected group from the other selection subjects.

In a seventh aspect based on the first aspect, the subject selecting step includes a subject display control step (S60). The subject display control step, when a selection subject is selected, displays the selected selection subject on the display screen while distinguishing the selected selection subject from the other selection subjects.

In an eighth aspect based on the first aspect, the subject selecting program causes the computer to further execute a setting step (setting of Db2). The setting step previously sets the groups to which the plurality of selection subjects belong and corresponding input sections of the input device.

In a ninth aspect based on the first aspect, the subject selecting program causes the computer to further execute a setting step. The setting step divides and sets the plurality of selection subjects into groups to each of which a predetermined number of selection subjects belong.

In a tenth aspect based on the first aspect, the subject selecting program causes the computer to further execute a setting step. The setting step divides and sets the plurality of selection subjects into groups to each of which selection subjects displayed adjacent to each other on the display screen belong.

In an eleventh aspect based on the first aspect, the selection subject is an object (OBJa to OBJp) which is displayed on the display screen and on which a character is written. In the processing step, a process of inputting a character written on an object selected in the subject selecting step is performed.

In a twelfth aspect based on the first aspect, the selection subject is a character (Wa to Wp) displayed on the display screen. In the processing step, a process of inputting a character selected in the subject selecting step is performed.

A thirteenth aspect of certain exemplary embodiments is directed to a subject selecting apparatus for selecting one from a plurality of selection subjects displayed on a display screen using a pointing device for outputting coordinate information based on a predetermined coordinate system, depending on a player's operation, and an input device for outputting a predetermined operation signal of a plurality of types of operation signals, depending on a player's operation. The apparatus comprises a selection subject display control means, a first operation information obtaining means, a group selecting means, a second operation information obtaining means, a second operation information obtaining means, and a processing means. The selection subject display control means displays, on the display screen, a plurality of selection subjects which are divided into groups under a predetermined condition. The first operation information obtaining means obtains coordinate information output from the pointing device. The group selecting means selects one from the groups into which the plurality of selection subjects are divided, based on the coordinate information obtained by the first operation information obtaining means. The second operation information obtaining means obtains an operation signal output from the input device after the group is selected by the group selecting means. The subject selecting means selects one from selection subjects belonging to the group selected by the group selecting means, based on the operation signal obtained by the second operation information obtaining means. The processing means performs a process, depending on the selection subject selected by the subject selecting means.

In a fourteenth aspect based on the thirteenth aspect, the group selecting means converts the coordinate information output from the pointing device into coordinates in a screen coordinate system provided on the display screen, and selects one group displayed at a position having the coordinates on the display screen, from the group into which the plurality of selection subjects are divided.

In a fifteenth aspect based on the thirteenth aspect, the subject selecting means selects one selection subject displayed in a shape or at a position mimicking an installed position of an input section of the input device which outputs the operation signal obtained by the second operation information obtaining means, from the selection subjects belonging to the group selected by the group selecting means.

In a sixteenth aspect based on the fifteenth aspect, the group selecting means includes a selection subject display position change control means. The selection subject display position change control means, when a group is selected, changes selection subjects belonging to the selected group into shapes or positions mimicking installed positions of input sections of the input device, and displays the resultant selection subjects on the display screen.

In a seventeenth aspect based on the thirteenth aspect, the group selecting means includes a sign display addition control means. The sign display addition control means, when a group is selected, assigns signs indicating functions assigned to respective input sections of the input device, to the respective selection subjects belonging to the selected group, and displays the selection subjects. The subject selecting means selects one selection subject displayed, being assigned a sign indicating a function assigned to an input section of the input device which outputs the operation signal obtained by the second operation information obtaining means, from the selection subjects belonging to the group selected by the group selecting means.

In an eighteenth aspect based on the thirteenth aspect, the group selecting means includes a selected group display control means. The selected group display control means, when a group is selected, displays selection subjects belonging to the selected group on the display screen while distinguishing the selection subjects belonging to the selected group from the other selection subjects.

In a nineteenth aspect based on the thirteenth aspect, the subject selecting means includes a subject display control means. The subject display control means, when a selection subject is selected, displays the selected selection subject on the display screen while distinguishing the selected selection subject from the other selection subjects.

In a twentieth aspect based on the thirteenth aspect, the subject selecting apparatus further comprises a setting means. The setting means previously sets the groups to which the plurality of selection subjects belong and corresponding input sections of the input device.

In a twenty-first aspect based on the thirteenth aspect, the subject selecting apparatus further comprises a setting means. The setting means divides and sets the plurality of selection subjects into groups to each of which a predetermined number of selection subjects belong.

In a twenty-second aspect based on the thirteenth aspect, the subject selecting apparatus further comprises a setting means. The setting means divides and sets the plurality of selection subjects into groups to each of which selection subjects displayed adjacent to each other on the display screen belong.

According to the first aspect, a plurality of selection subjects are divided into groups under predetermined conditions, and any of the resultant groups is selected using a pointing device. Thereafter, selection subjects in the selected group are associated with input devices, such as input keys, input buttons, or the like, and a desired selection subject can be selected by operating a corresponding input device. Therefore, in a case where it is difficult to select individual selection subjects using pointing devices, a plurality of selection subjects are divided into groups, thereby obtaining relatively large selection subjects. Therefore, it is easy to select any of selection subjects having relatively large selection areas. Also, since any of the groups is selected using a pointing device and any of individual selection subjects included in the group is selected using an input device, thereby making it possible to efficiently select a desired selection subject. Also, the groups into which the selection subjects are divided can be reduced to a level which allows any of the groups to be selected using a pointing device, so that the selection subjects can be displayed even in a size which makes it difficult to select any of the individual selection subjects using a pointing device, thereby making it possible to efficiently utilize an area indicating a selection subject.

According to the second aspect, the selection subject groups are displayed and any of them can be directly selected using a pointing device, so that a group selecting operation can be easily recognized and intuitively performed by the user.

According to the third aspect, an input device which is operated so as to select one selection subject is displayed to the user, indicting a shape and an arranged position of an input section thereof, thereby making it possible to clearly indicating an operation for selecting a selection subject.

According to the fourth aspect, selection subjects selected as a group are shifted, so that an input device which is operated so as to select one selection subject is displayed to the user, indicting a shape and an arranged position of an input section thereof, thereby making it possible to clearly indicating an operation for selecting a selection subject, and at the same time, notify the user of the selected group.

According to the fifth aspect, an input device which is operated so as to select one selection subject is displayed to the user, indicting a sign indicating a function (an A button, an X button, etc.), thereby making it possible to clearly indicating an operation for selecting a selection subject.

According to the sixth aspect, the user can be notified of a selected group.

According to the seventh aspect, the user can be notified of one selected selection subject.

According to the eighth aspect, a group or an operation method for selecting a selection subject is fixed, and therefore, when the user becomes used to the group or the operation method, the user can efficiently perform an operation of selecting a selection subject.

According to the ninth aspect, when the same number of selection subjects is grouped into one, a common operation after selecting a group can be used, thereby making it possible to fix an operation of selecting a selection subject.

According to the tenth aspect, selection subjects adjacent to each other are grouped, thereby making it easy to recognize a selection subject belonging to a group.

According to the eleventh aspect, objects (keys, etc.) on which characters are written are arranged, thereby making it possible to express a virtual keyboard. Therefore, a software keyboard with which a selected character is input can be provided.

According to the twelfth aspect, a plurality of characters are arranged, thereby making it possible to express a virtual keyboard. Therefore, a software keyboard with which a selected character is input can be provided.

According to the subject selecting apparatus of certain exemplary embodiments, an effect similar to that of the storage medium storing the subject selecting program can be obtained.

These and other features, aspects and advantages of the certain exemplary embodiments described herein will become more apparent from the following detailed description when taken in conjunction with the accompanying drawings.

BRIEF DESCRIPTION OF THE DRAWINGS

FIG. 1 is a diagram illustrating an external appearance of a game system 1 according to an exemplary embodiment;

FIG. 4 is a perspective view of the controller 7 of FIG. 1 as viewed from the bottom and the rear;

FIG. 8 is a front view of the controller 7 where the controller 7 is held by the right hand of a player;

FIG. 14 is a diagram illustrating a second example displayed on the monitor 2 when the group G0 of FIG. 12 is pointed out by the controller 7;

FIG. 15 is a diagram illustrating a third example displayed on the monitor 2 when the group G0 of FIG. 12 is pointed out by the controller 7;

FIG. 16 is a diagram illustrating a fourth example displayed on the monitor 2 when the group G0 of FIG. 12 is pointed out by the controller 7;

FIG. 17 is a diagram illustrating a fifth example displayed on the monitor 2 when the group G0 of FIG. 12 is pointed out by the controller 7;

FIG. 18 is a diagram illustrating another exemplary set of a plurality of key objects OBJa to OBJp displayed on the monitor 2;

FIG. 19 is a diagram for describing a state in which the key objects OBJa to OBJp of FIG. 18 are divided into four groups G0 to G3;

FIG. 20 is a diagram illustrating a first example displayed on the monitor 2 when the group G0 of FIG. 19 is pointed out by the controller 7;

FIG. 23 is a diagram illustrating a relationship between key characters and key numbers;

FIG. 24 is a diagram illustrating an exemplary keyboard table;

FIG. 26 is a diagram illustrating an example in which sixteen key objects OBJa to OBJp are divided into eight groups G0 to G7 each including 1×2 objects (two objects);

FIG. 27 is a diagram illustrating an exemplary display which is presented on the monitor 2 when displayed key characters W are selection subjects;

DETAILED DESCRIPTION

Figure 2:
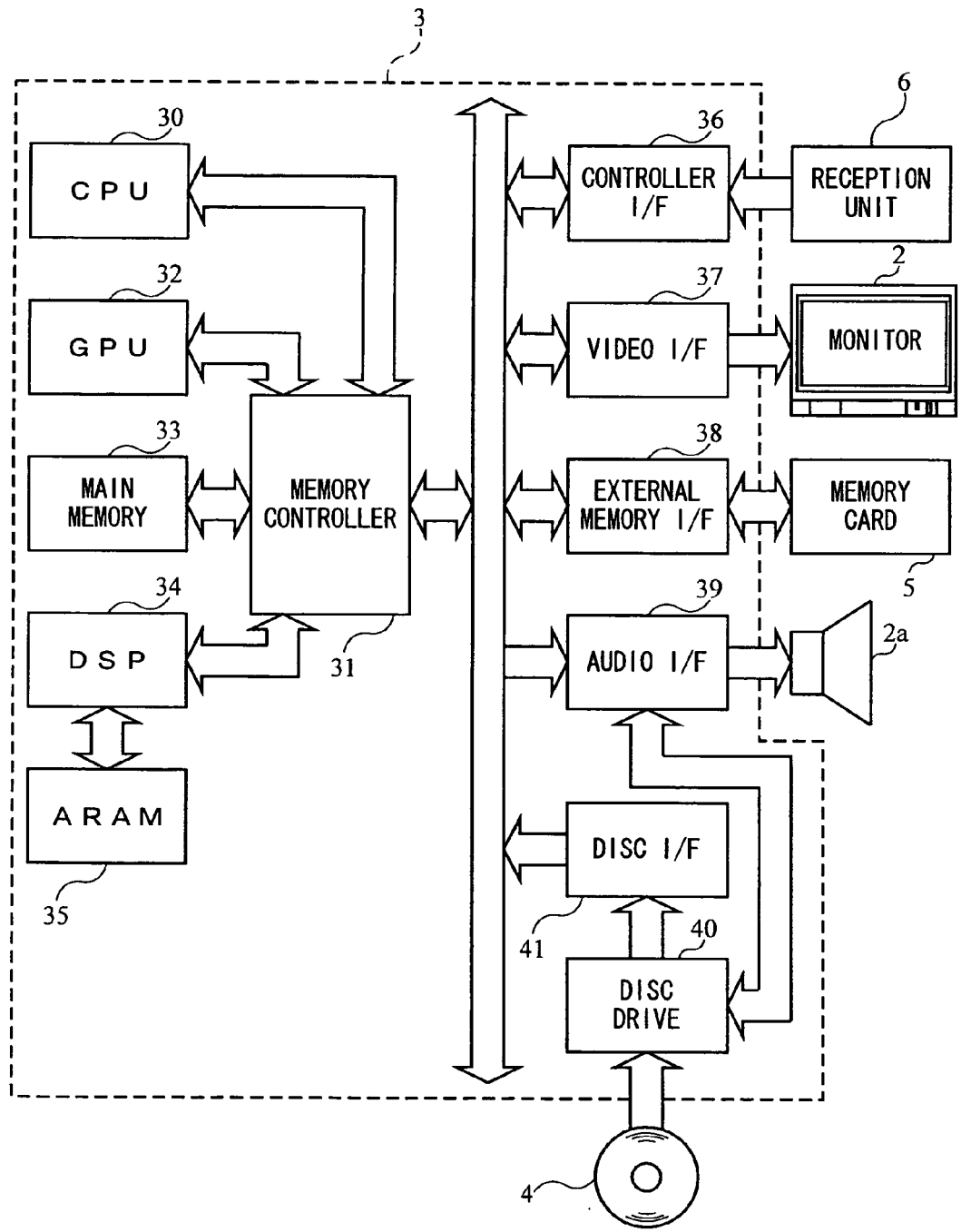
FIG. 2 is a functional block diagram of a game apparatus 3 of FIG. 1.

A subject selecting apparatus according to a certain exemplary embodiment will be described with reference to FIG. 1. A game system 1 including the subject selecting apparatus will be described as an example so as to specifically describe the certain exemplary embodiment. Note that FIG. 1 is an external appearance diagram for describing the game system 1. Hereinafter, the game system 1 will be described, illustrating a stationary game apparatus as an example of the subject selecting apparatus of a certain exemplary embodiment.

In FIG. 1, the game system 1 is composed of a stationary game apparatus (hereinafter simply referred to as a game apparatus) 3 which is connected via a connection code to a display (hereinafter referred to as a monitor) 2 with a loud-speaker 2a, such as a television set for home use or the like, and a controller 7 which inputs operation information to the game apparatus 3. The game apparatus 3 is connected via a connection terminal to a reception unit 6. The reception unit 6 receives transmission data wirelessly transmitted from the controller 7, so that the controller 7 and the game apparatus 3 are connected together via wireless communication. An optical disc 4 which is an exemplary information storing medium changeable with respect to the game apparatus 3, is detachably attached to the game apparatus 3. On an upper major surface of the game apparatus 3, a power ON/OFF switch for the game apparatus 3, a reset switch for a game process, and an OPEN switch for opening an upper lid of the game apparatus 3, are provided. Here, the lid is opened by a player pushing down the OPEN switch, so that the optical disc 4 can be attached or detached.

An external memory card 5 carrying, for example, a backup memory fixedly storing saved data or the like, is detachably attached to the game apparatus 3 as required. The game apparatus 3 executes a game program or the like stored on the optical disc 4, and displays a result of the execution as a game image on the monitor 2. Note that a subject selecting program of certain exemplary embodiments is assumed to be included in a portion of the game program stored on the optical disc 4. The game apparatus 3 can also reproduce a game state which was executed in the past, using the saved data stored in the external memory card 5, and display a resultant game image on the monitor 2. The player of the game apparatus 3 can enjoy events of the game by operating the controller 7 while watching a game image displayed on the monitor 2.

The controller 7 wirelessly transmits transmission data from a communication section 75 (described below) included therein to the game apparatus 3 to which the reception unit 6 is connected, using, for example, the Bluetooth® technique. The controller 7 is an operation means for mainly performing an operation for selecting one from a plurality objects (selection subjects) displayed on the monitor 2. The controller 7 is provided with an operation section composed of a plurality of operation buttons, keys and sticks, and the like. As described below, the controller 7 also comprises an image capture information computing section 74 for capturing an image viewed from the controller 7. As exemplary targets whose images are to be captured by the image capture information computing section 74, two LED modules (hereinafter referred to as markers) 8L and 8R are provided in the vicinity of a display screen of the monitor 2. The markers 8L and 8R each emit infrared light toward the front of the monitor 2.

Next, a configuration of the game apparatus 3 will be described with reference to FIG. 2. Note that FIG. 2 is a functional block diagram of the game apparatus 3.

In FIG. 2, the game apparatus 3 comprises, for example, a RISC CPU (central processing unit) 30 which executes various programs. The CPU 30 executes a boot program stored in a boot ROM (not shown) and performs, for example, initialization of memories, such as a main memory 33 and the like, before executing a game program stored in the optical disc 4, and performing, for example, a game process corresponding to the game program. A GPU (Graphics Processing Unit) 32, the main memory 33, a DSP (Digital Signal Processor) 34, and an ARAM (Audio RAM) 35 are connected via a memory controller 31 to the CPU 30. A controller I/F (interface) 36, a video I/F 37, an external memory I/F 38, an audio I/F 39, and a disc I/F 31 are connected via a predetermined bus to the memory controller 31. The reception unit 6, the monitor 2, the external memory card 5, a loudspeaker 2a, and a disc drive 40 are connected to the controller I/F 36, the video I/F 37, the external memory I/F 38, the audio I/F 39, and the disc I/F 41, respectively.

The GPU 32 performs image processing based on an instruction from the CPU 30, and is composed of, for example, a semiconductor chip which performs a calculation process required for 3D graphics display. The GPU 32 performs image processing using a memory specialized for image processing or a memory area which is a portion of the main memory 33. The GPU 32 uses these to generate object image data, game image data or movie video to be displayed on the monitor 2, and outputs the data via the memory controller 31 and the video I/F 37 to the monitor 2 as appropriate.

The main memory 33 is a memory area used in the CPU 30, and stores a game program or the like required for a process by the CPU 30 as appropriate. For example, the main memory 33 stores a game program, various data, or the like read from the optical disc 4 by the CPU 30. The game program, the various data, or the like stored in the main memory 33 are executed by the CPU 30.

The DSP 34 processes sound data or the like which is generated in the CPU 30 when a game program is executed.

The ARAM 35 for storing the sound data or the like is connected to the DSP 34. The ARAM 35 is used when the DSP 34 performs a predetermined process (e.g., storage of a read-ahead game program or sound data). The DSP 34 reads sound data stored in the ARAM 35, and outputs the data via the memory controller 31 and the audio I/F 39 to the loudspeaker 2a included in the monitor 2.

The memory controller 31 performs a centralized control of data transfer. The above-described various I/Fs are connected to the memory controller 31. The controller I/F 36 is composed of, for example, four controller I/Fs 36a to 36d, and communicably connects an external apparatus which can be engaged with the four controller I/Fs 36a to 36d via connectors thereof, and the game apparatus 3. For example, the reception unit 6 is engaged with the connector to be connected via the controller I/F 36 to the game apparatus 3. As described above, the reception unit 6 receives transmission data from the controller 7, and outputs the transmission data via the controller I/F 36 to the CPU 30. The monitor 2 is connected to the video I/F 37. The external memory card 5 is connected to the external memory I/F 38, thereby making it possible to access a backup memory or the like provided in the external memory card 5. The loudspeaker 2a included in the monitor 2 is connected to the audio I/F 39 so that sound data read from the ARAM 35 by the DSP 34 or sound data directly output from the disc drive 40 can be output from the loudspeaker 2a. The disc drive 40 is connected to the disc I/F 41. The disc drive 40 reads data stored at a predetermined read-out position on the optical disc 4, and outputs the data to the bus and the audio I/F 39 of the game apparatus 3.

Figure 3:
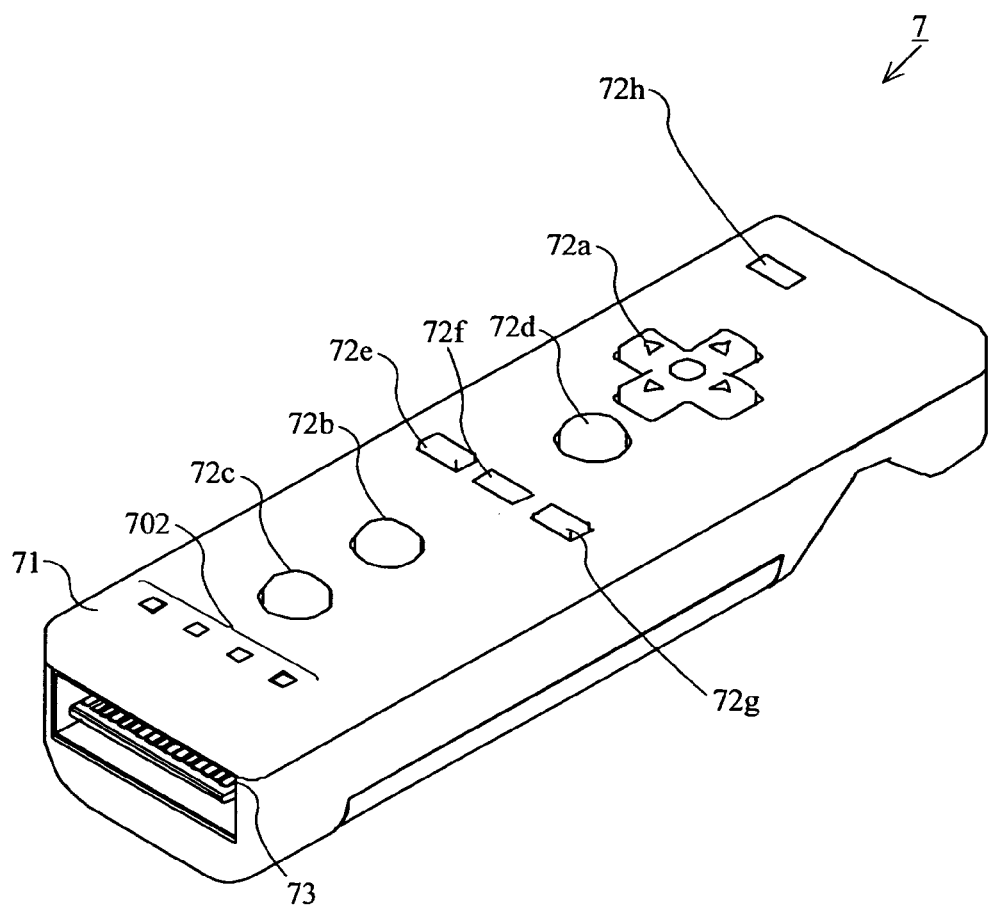
FIG. 3 is a perspective view of a controller 7 of FIG. 1 as viewed from the top and the rear.

The controller 7 will be described with reference to FIGS. 3 and 4. FIG. 3 is a perspective view of the controller 7 as viewed from the top and the rear. FIG. 4 is a perspective view of the controller 7 as viewed from the bottom and the rear.

In FIGS. 3 and 4, the controller 7 has a housing 71 formed by, for example, plastic molding. The housing 71 is provided with a plurality of operation sections 72. The housing 71 is in the shape of substantially a rectangular parallelepiped where a front-to-rear direction is a longitudinal direction. The whole housing 71 has a size which allows an adult and a child to hold the controller 7 with one hand.

A cross key 72a is provided on a central portion closer to a front side of an upper surface of the housing 71. The cross key 72a is a four-direction push switch in the shape of a cross, and has operation portions corresponding to the respective four directions (frontward, rearward, leftward, and rightward) indicated by arrows, the operation portions being provided at the respective projecting pieces of the cross arranged at intervals of 90°. Any of the frontward, rearward, leftward, and rightward directions is selected by the player pushing down any of the operation portions of the cross key 72a. As described above, for example, by the player operating the cross key 72a, one object can be selected from a plurality of objects.

Note that the cross key 72a is an operation section which outputs an operation signal, depending on the above-described direction input operation of the player, or may be an operation section in other embodiments. For example, a complex switch composed of push switches arranged in a ring shape, corresponding to the four direction operation sections, and a center switch provided at a center thereof, may be provided instead of the cross key 72a. Also, instead of the cross key 72a, an operation section may be provided which outputs an operation signal, depending on a tilt direction of a stick which projects from the upper surface of the housing 71 and can be tilted. Also, instead of the cross key 72a, an operation section may be provided which outputs an operation signal, depending on a slide direction of an disc-like member which can be moved in a horizontal direction. Also, a touch pad may be provided instead of the cross key 72a. Also, instead of the cross key 72a, an operation section may be provided which outputs an operation signal, depending on which is pushed down among switches indicating at least four directions (frontward, rearward, leftward, and rightward).

A plurality of operation buttons 72b to 72g are provided at the rear of the cross key 72a on the upper surface of the housing 71. The operation buttons 72b to 72g are operation sections which output operation signals assigned to the respective operation buttons 72b to 72g when the player pushes down the head portions of the respective buttons. For example, functions of an X button, a Y button, a B button, and the like are assigned to the operation buttons 72b to 72d. Functions of a select switch, a menu switch, a start switch, and the like are assigned to the operation buttons 72e to 72g. Although the operation buttons 72b to 72g are assigned the respective functions, depending on a game program executed by a game apparatus 3, those are not directly involved with the detailed description and will not be described in detail. Note that, in the exemplary arrangement of FIG. 3, the operation buttons 72b to 72d are aligned on a central portion in a front-to-rear direction of the upper surface of the housing 71. The operation buttons 72e to 72g are aligned in a lateral direction on the upper surface of the housing 71 and between the operation buttons 72b and 72d. The operation button 72f is a button of a type whose upper surface is buried below the upper surface of the housing 71 so that the player is prevented from unintentionally and erroneously pushing down the button.

An operation button 72h is provided at the front of the cross key 72a on the upper surface of the housing 71. The operation button 72h is a power supply switch which remotely switches ON/OFF a power supply for the main body of the game apparatus 3. The operation button 72h is also a button of a type whose upper surface is buried below the upper surface of the housing 71 so that the player is prevented from unintentionally and erroneously pushing down the button.

A plurality of LEDs 702 are provided at the rear of respect to the operation button 72c of the upper surface of the housing 71. Here, the controller 7 is assigned controller identification (number) so as to distinguish it from other controllers 7. For example, the LEDs 702 are used so as to inform the player of controller identification currently set for the controller 7. Specifically, when transmission data is transmitted from the controller 7 to the reception unit 6, one of the plurality of LEDs 702 is turned ON, depending on the controller identification.

On the other hand, a hollow portion is formed on a lower surface of the housing 71. The hollow portion on the lower surface of the housing 71 is formed at a position where the index finger or the middle finger of the player is placed when the player holds the controller 7, as specifically described below. An operation button 72i is provided on a rear slope surface of the hollow portion. The operation button 72i is an operation section which functions as, for example, an A button, and which is used as a trigger switch for a shooting game, or for an operation of causing the player object to be noticeable with respect to a predetermined object, or the like.

An image capturing element 743 which is a part of the image capture information computing section 74 is provided on a front surface of the housing 71. Here, the image capture information computing section 74 is a system for analyzing image data captured by the controller 7 to determine a place having a high luminance in the image data and detecting a center-of-gravity position or a size of the place. The image capture information computing section 74 has, for example, a maximum sampling cycle of about 200 frames/sec, and therefore, can track and analyze relatively high-speed movement of the controller 7. A detailed configuration of the image capture information computing section 74 will be described below. A connector 73 is provided on a rear surface of the housing 71. The connector 33 is, for example, a 32-pin edge connector which is utilized so as to be engaged and connected with a connection cable.

Figure 5A:
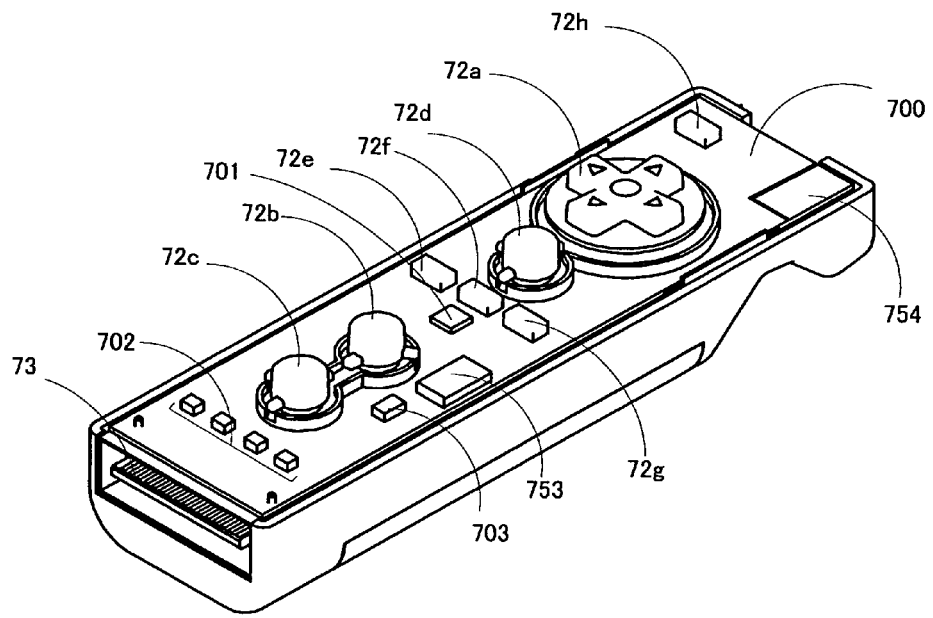
FIG. 5A is a perspective view of the controller 7 where an upper housing is cut away.
Figure 5B:
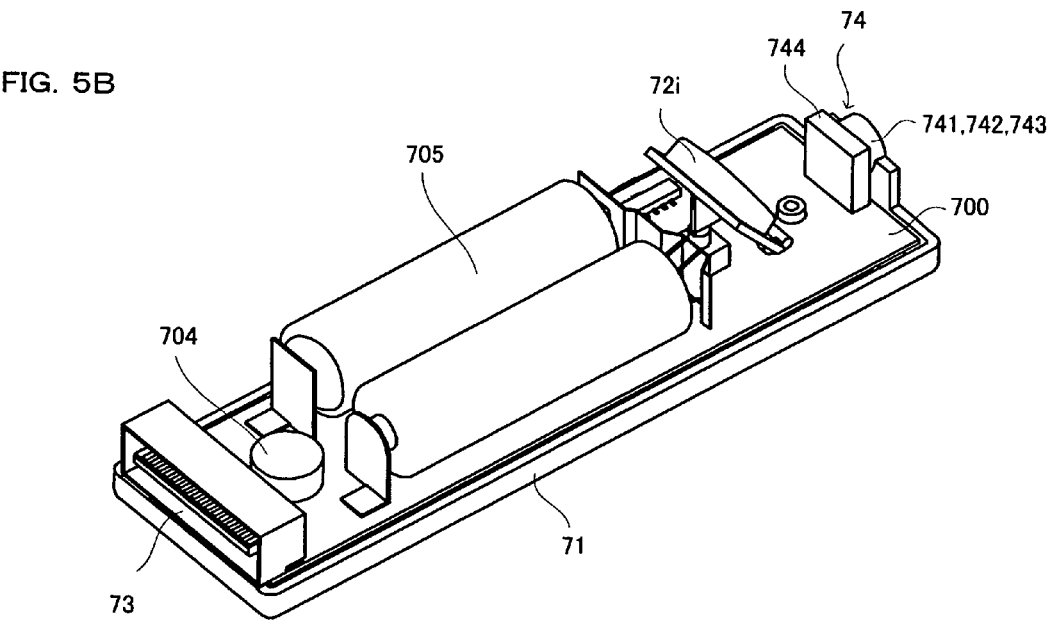
FIG. 5B is a perspective view of the controller 7 where a lower housing is cut away.

Next, an internal structure of the controller 7 will be described with reference to FIGS. 5A and 5B. Note that FIG. 5A is a perspective view of the controller 7 where an upper housing (a portion of the housing 71) is cut away. FIG. 5B is a perspective view of the controller 7 where a lower housing (a portion of the housing 71) is cut away. FIG. 5B illustrates a perspective view of a base board 700 of FIG. 5A as viewed from a bottom surface thereof.

In FIG. 5A, the base board 700 is fixed inside the housing 71. On an upper major surface of the base board 700, operation buttons 72a to 72h, an acceleration sensor 701, the LEDs 702, a quartz oscillator 703, a radio module 753, an antenna 754, and the like are provided. These are connected to a microcomputer 751 (see FIG. 6) via a conductor (not shown) formed on the base board 700 and the like. The controller 7 functions as a wireless controller by means of the radio module 753 and the antenna 754. Note that the quartz oscillator 703 generates a basic clock for the microcomputer 751 (described below).

On the other hand, in FIG. 5B, the image capture information computing section 74 is provided at a front edge of a lower major surface of the base board 700. The image capture information computing section 74 is composed of an infrared filter 741, a lens 742, an image capturing element 743, and an image processing circuit 744, which are attached to the lower major surface of the base board 700 in this order from the front of the controller 7. The connector 73 is attached to a rear edge of the lower major surface of the base board 700. The operation button 72i is attached at the rear of the image capture information computing section 74 and on the lower major surface of the base board 700. Batteries 705 are housed at the rear of the operation button 72i. A vibrator 704 is attached on the lower major surface of the base board 700 and between the batteries 705 and the connector 73. The vibrator 704 may be, for example, a vibration motor or a solenoid. Vibration occurs in the controller 7 by an action of the vibrator 704, and is transferred to the player who is holding the controller 7, thereby achieving a so-called vibration feature-supporting game.

Next, an internal configuration of FIG. 6 will be described with reference to FIG. 6. Note that FIG. 6 is a block diagram illustrating the configuration of the controller 7.

Figure 6:
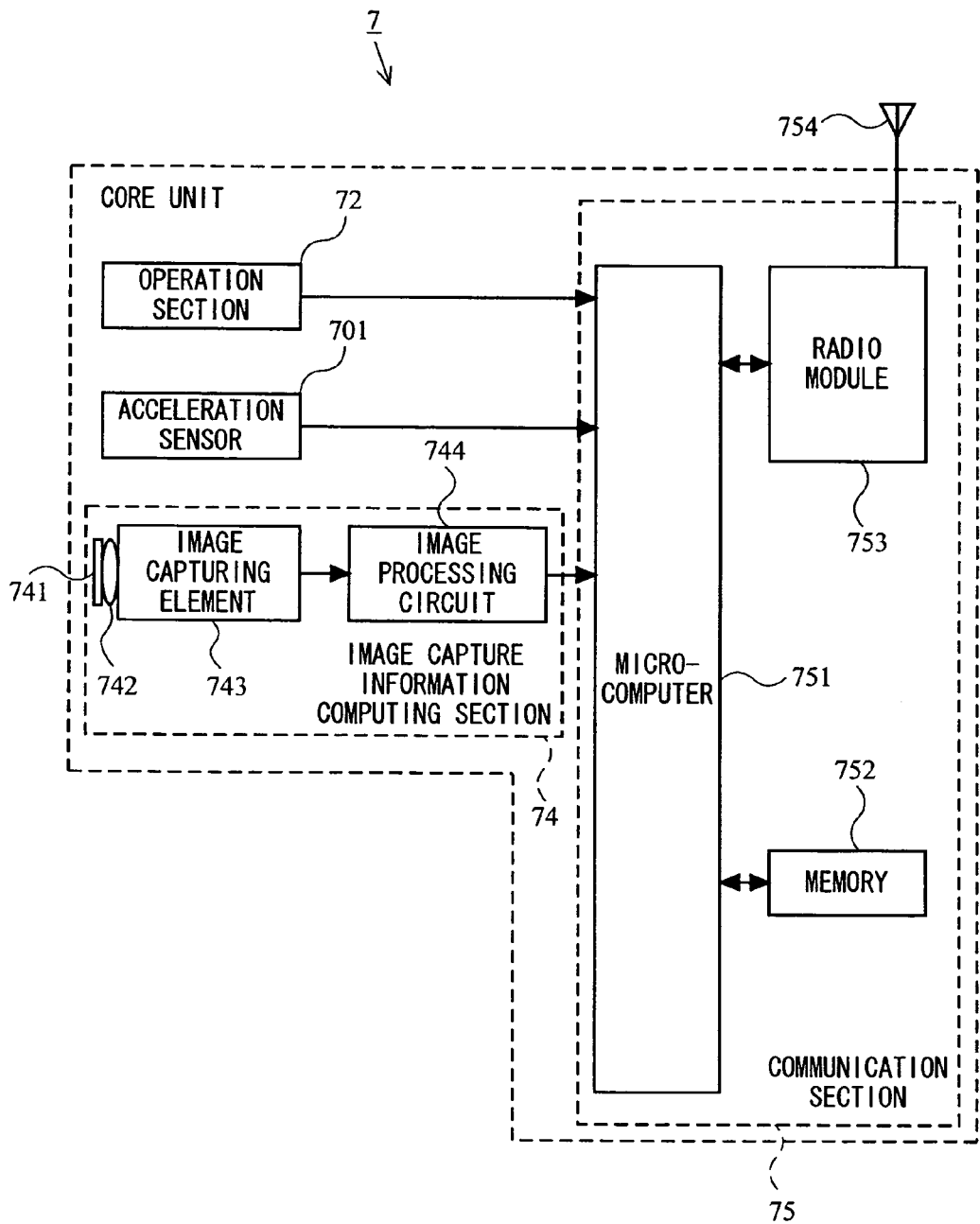
FIG. 6 is a block diagram illustrating a configuration of the controller 7 of FIG. 3.

In FIG. 6, the controller 7 comprises the operation section 72, the image capture information computing section 74, the communication section 75, and the acceleration sensor 701.

The image capture information computing section 74 includes the infrared filter 741, the lens 742, the image capturing element 743, and the image processing circuit 744. The infrared filter 741 passes only infrared light entering from the front of the controller 7. The lens 742 collects infrared light passing through the infrared filter 741 and causes the light to enter the image capturing element 743. The image capturing element 743 may be, for example, a solid-state image capturing element, such as a CMOS (Complementary Metal Oxide Semiconductor) sensor or a CCD (Charge Coupled Device), and captures infrared light collected by the lens 742. Therefore, the image capturing element 743 captures only infrared light passing through the infrared filter 741 to generate image data. The image data generated by the image capturing element 743 is processed by the image processing circuit 744. Specifically, the image processing circuit 744 processes the image data obtained from the image capturing element 743 to sense a high luminance portion, and outputs process result data indicating a result of detection of position coordinates or an area thereof to the communication section 75. Note that the image capture information computing section 74 is fixed to the housing 71 of the controller 7, so that an image capturing direction thereof can be changed by changing the orientation of the housing 71 itself. As specifically described below, a signal corresponding to a position or a motion of the controller 7 can be obtained based on the process result data output from the image capture information computing section 74, and based on the signal, input coordinates can be obtained based on a screen coordinate system of the monitor 2. In other words, the controller 7 functions as a pointing device using the process result data output from the image capture information computing section 74.

The acceleration sensor 701 is an acceleration sensor which senses an acceleration with respect to each of the three axes, i.e., the vertical direction, the lateral direction, and the front-to-rear direction of the controller 7. Note that the acceleration sensor 701 may be an acceleration sensor which detects an acceleration with respect to each of two axes (i.e., the vertical direction and the lateral direction) or an acceleration sensor which detects an acceleration any one of the axes, depending on the type of a required operation signal. Data indicating an acceleration sensed by the acceleration sensor 701 is output to the communication section 75.

For example, any of these one- to three-axis acceleration sensors 701 may be of a type which is available from Analog Devices, Inc. or STMicroelectronics N.V. The acceleration sensor 701 is preferably of a capacitance type (capacitance coupling type) based on a technique of MEMS (Micro Electro Mechanical Systems) obtained by micromachining silicon. However, any of one- to three-axis acceleration sensors 701 may be provided using a technique of existing acceleration detecting means (e.g., a piezoelectric type or a piezoelectric resistance type) or other appropriate techniques which will be developed in the future.

As is known to those skilled in the art, an acceleration detecting means used as the acceleration sensor 701 can detect only an acceleration (linear acceleration) along a straight line corresponding to each axis of an acceleration sensor. In other words, a direct output from the acceleration sensor 701 is a signal indicating a linear acceleration (static or dynamic) along any of the one to three axes. Therefore, the acceleration sensor 701 cannot directly detect physical properties, such as a motion along a non-linear path (e.g., an arc, etc.), a rotation, a rotational motion, an angular displacement, a tilt, a position, an attitude, and the like.

However, it would be easily understood by those skilled in the art from the description of the present specification that further information about the controller 7 can be estimated or calculated by performing an additional process with respect to an acceleration signal output from the acceleration sensor 701. For example, when a static acceleration (gravity acceleration) is sensed, an output from the acceleration sensor 701 is used to perform a computation using a tilt angle and the detected acceleration, thereby making it possible to determine a tilt of a target (the controller 7) with respect to a gravity vector. Thus, by using the acceleration sensor 701 in combination with the microcomputer 751 (or other processors), the tilt, attitude or position of the controller 7 can be determined. Similarly, for example, when the controller 7 comprising the acceleration sensor 701 is dynamically accelerated and moved by a user's hand as described below, various motions and/or positions of the controller 7 can be calculated by processing an acceleration signal generated by the acceleration sensor 701. In other examples, the acceleration sensor 701 may comprise an incorporation-type signal processing device or other types of dedicated processing devices for performing a desired process with respect to an acceleration signal output from a built-in acceleration detecting means before outputting a signal to the microcomputer 751. For example, the incorporation-type or dedicated processing device, when used for detection of a static acceleration (e.g., a gravity acceleration) by the acceleration sensor, may be for converting a sensed acceleration signal into a tilt angle corresponding thereto.

In other embodiments, instead of the acceleration sensor 701, a gyro-sensor comprising a rotation element, a vibration element, or the like may be employed. An exemplary MEMS gyro-sensor used in this embodiment is available from Analog Devices, Inc. As is different from the acceleration sensor 701, the gyro-sensor can directly sense rotation (or an angular velocity) about an axis of at least one gyro-element included therein. Thus, since the gyro-sensor and the acceleration sensor are basically different from each other (e.g., an output based on an angle and an output based on a vector), one of them is selected, depending on the individual application, and processes performed for output signals from these devices need to be changed as appropriate. The properties of the gyroscope as well as the basic difference between the acceleration detecting means and the gyroscope are know to those skilled in the art, and will not be herein described in more detail. Whereas the gyro-sensor has an advantage of directly sensing rotation, the acceleration sensor generally has an advantage over the gyro-sensor in terms of cost effectiveness when the acceleration sensor is applied to a controller as used in this.

The communication section 75 comprises the microcomputer 751, a memory 752, the radio module 753, and the antenna 754. The microcomputer 751 controls the radio module 753 for wirelessly transmitting transmission data while using the memory 752 as a memory area during a process.

An operation signal (operation section data) from the operation section 72 provided in the controller 7, acceleration signals in the three axial directions (acceleration data) from the acceleration sensor 701, and process result data from the image capture information computing section 74, are output to the microcomputer 751. The microcomputer 751 temporarily stores the received data (the operation section data, the acceleration data, and the process result data), as transmission data to be transmitted to the reception unit 6, into the memory 752. Here, radio transmission from the communication section 75 to the reception unit 6 is performed in predetermined cycles. Since a game is generally processed in units of 1/60 sec, the cycle of the radio transmission needs to be shorter than 1/60 sec. Specifically, the game processing unit is 16.7 ms (1/60 sec), and the transmission interval of the communication section 75 employing Bluetooth® is 5 ms. When timing of transmission to the reception unit 6 arrives, the microcomputer 751 outputs transmission data stored in the memory 752, as a series of pieces of operation information, to the radio module 753. Thereafter, the radio module 753 emits the operation information, as a radio signal, from the antenna 754 using a carrier wave by means of, for example, the Bluetooth® technique. Specifically, the operation section data from the operation section 72 provided in the controller 7, the acceleration data from the acceleration sensor 701, and the process result data from the image capture information computing section 74 are transmitted from the controller 7. Thereafter, the reception unit 6 of the game apparatus 3 receives the radio signal, and the game apparatus 3 demodulates or decodes the radio signal, thereby obtaining a series of pieces of operation information (the operation section data, the acceleration data, and the process result data). Thereafter, the CPU 30 of the game apparatus 3 performs a game process based on the obtained operation information and a game program. Note that, when the communication section 75 is configured using the Bluetooth® technique, the communication section 75 can also have a function of receiving transmission data wirelessly transmitted from other devices.

Figure 7:
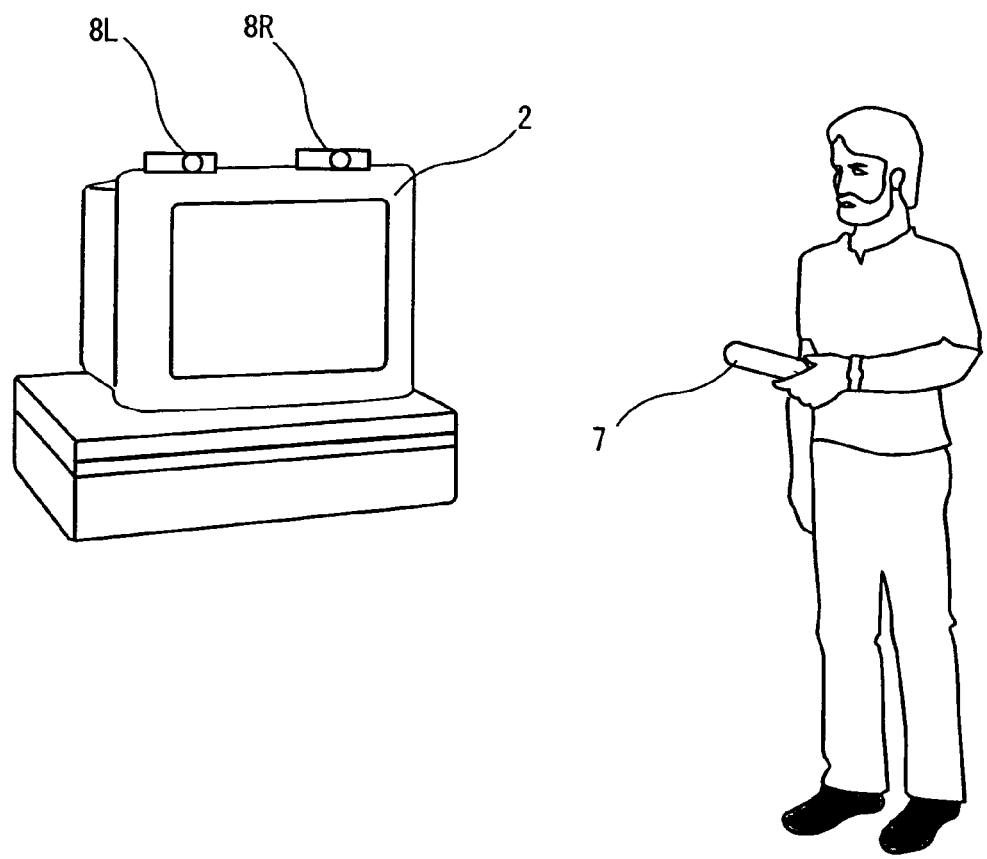
FIG. 7 is a diagram roughly illustrating a situation in which a game operation is performed using the controller 7 of FIG. 3.
Figure 9:
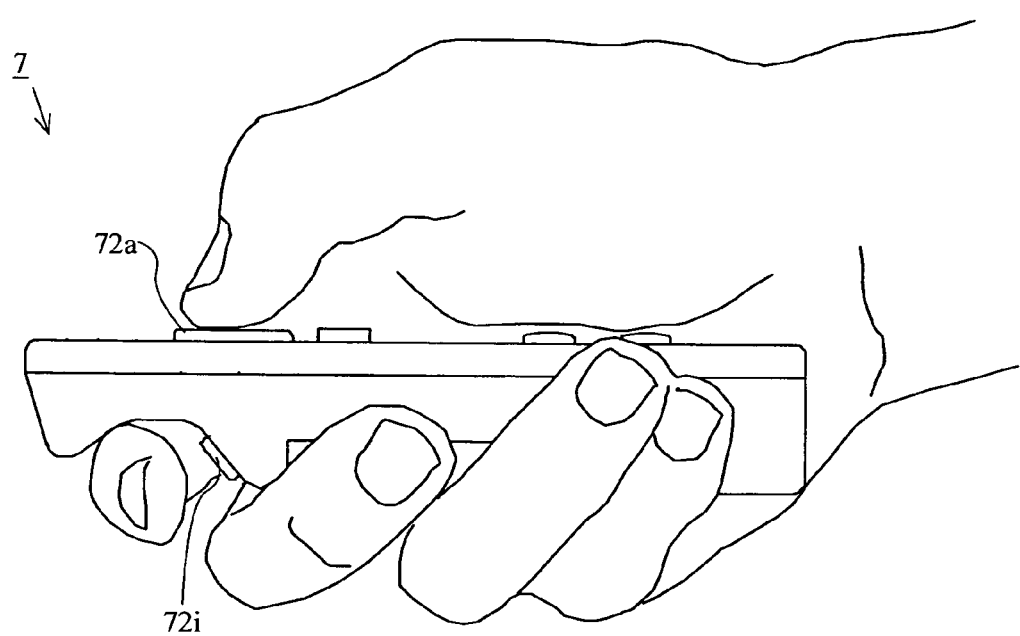
FIG. 9 is a left side view of the controller 7 where the controller 7 is held by the right hand of a player.

As illustrated in FIG. 7, in order to play a game using the controller 7 in the game system 1, the player holds the controller 7 with one hand (e.g., the right hand) (see FIGS. 8 and 9). Thereafter, the player holds the controller 7 so that a front surface (a side having an opening for incident light to be captured by the image capture information computing section 74) faces the monitor 2. On the other hand, the two markers 8L and 8R are provided in the vicinity of the display screen of the monitor 2. The markers 8L and 8R each emit infrared light toward the front of the monitor 2, and are targets whose images are to be captured by the image capture information computing section 74.

When the player holds the controller 7 so that the front surface of the controller 7 faces the monitor 2, infrared light emitted by the two markers 8L and 8R enters the image capture information computing section 74. The incident infrared light is captured by the image capturing element 743 via the infrared filter 741 and the lens 742, and the captured image is processed by the image processing circuit 744. Here, the image capture information computing section 74 detects infrared components output from the markers 8L and 8R to obtain information about positions (positions of the target images) and areas of the markers 8L and 8R in the captured image. Specifically, the image processing circuit 744 analyzes image data captured by the image capturing element 743 to initially exclude images which cannot be formed by infrared light from the markers 8L and 8R, from the area information, and then determines that points having high luminance are positions of the markers 8L and 8R. Thereafter, the image capture information computing section 74 obtains positional information (e.g., a center-of-gravity position of these determined luminance points, etc.), and outputs the positional information as the process result data. Here, the positional information (the process result data) may be output as coordinate values where a predetermined reference point in a captured image (e.g., a center or an upper left corner of the captured image) is assumed to be the origin, or as a vector indicating a difference of a current luminance point position from a reference position where the reference position is a luminance point position with predetermined timing. In other words, the positional information about the target image, when a predetermined reference point is set for an image captured by the image capturing element 743, is a parameter which is used as a difference from the reference point. By transmitting the process result data to the game apparatus 3, a change amount of a signal corresponding to a motion, an attitude, a position and the like of the image capture information computing section 74 (i.e., the controller 7) with respect to the markers 8L and 8R can be obtained in the game apparatus 3 based on the difference of the positional information from the reference. Specifically, since the position of a high luminance point in an image transmitted from the communication section 75 is changed by moving the controller 7, by inputting a direction or a coordinate point corresponding to a change in the position of a high luminance point, a direction or a coordinate point can be input along a movement direction of the controller 7 with respect to a three-dimensional space. Note that, in an exemplary game process operation described below, the image capture information computing section 74 obtains the coordinates of the center-of-gravity position of the target image of each of the markers 8L and 8R, and outputs the coordinates as the process result data.

Thus, the image capture information computing section 74 of the controller 7 is used to capture an image of a fixedly provided marker (in the example, infrared light from two markers 8L and 8R), whereby operations corresponding to a motion, an attitude, a position and the like of the controller 7 can be performed by processing data output from the controller 7 in a process in the game apparatus 3, resulting in an intuitive operation input which is different from pushing down of an operation button or an operation key. Also, as described above, since the markers are provided in the vicinity of the display screen of the monitor 2, a position with respect to the markers can be easily converted into a motion, an attitude, a position and the like of the controller 7 with respect to the display screen of the monitor 2. In other words, the process result data (e.g., a motion, an attitude, a position and the like of the controller 7) can be used as an operation input which directly acts on the display screen of the monitor 2, so that the controller 7 can be caused to function as a pointing device.

A state in which the player holds the controller 7 with one hand will be described with reference to FIGS. 8 and 9. Note that FIG. 8 is a front view of the controller 7 where the controller 7 is held by the right hand of the player. FIG. 9 is a left side view of the controller 7 where the controller 7 is held by the right hand of the player.

As illustrated in FIGS. 8 and 9, the whole controller 7 has a size which allows an adult and a child to hold it with one hand. When the thumb of the player is placed on the upper surface of the controller 7 (e.g., near the cross key 72a), and the index finger of the player is placed the hollow portion of the lower surface of the controller 7 (e.g., near the operation button 72i), the light entering opening of the image capture information computing section 74 provided on the front surface of the controller 7 is exposed toward the front of the player. Note that the controller 7 can be similarly held by the left hand of the player.

Thus, the player can easily operate the operation section 72 (e.g., the cross key 72a, the operation button 72i, etc.) while holding the controller 7 with one hand. Further, when the player holds the controller 7 with one hand, the light entering opening of the image capture information computing section 74 provided on the front surface of the controller 7 is exposed, so that infrared light from the two markers 8L and 8R can be easily received through the light entering opening. In other words, the player can hold the controller 7 with one hand without inhibiting the function of the image capture information computing section 74 of the controller 7. Therefore, the controller 7 can further have an operation input function in which, when the player moves his or her hand which holds the controller 7 with respect to the display screen, the motion of the player's hand directly acts on the display screen.

Figure 10:
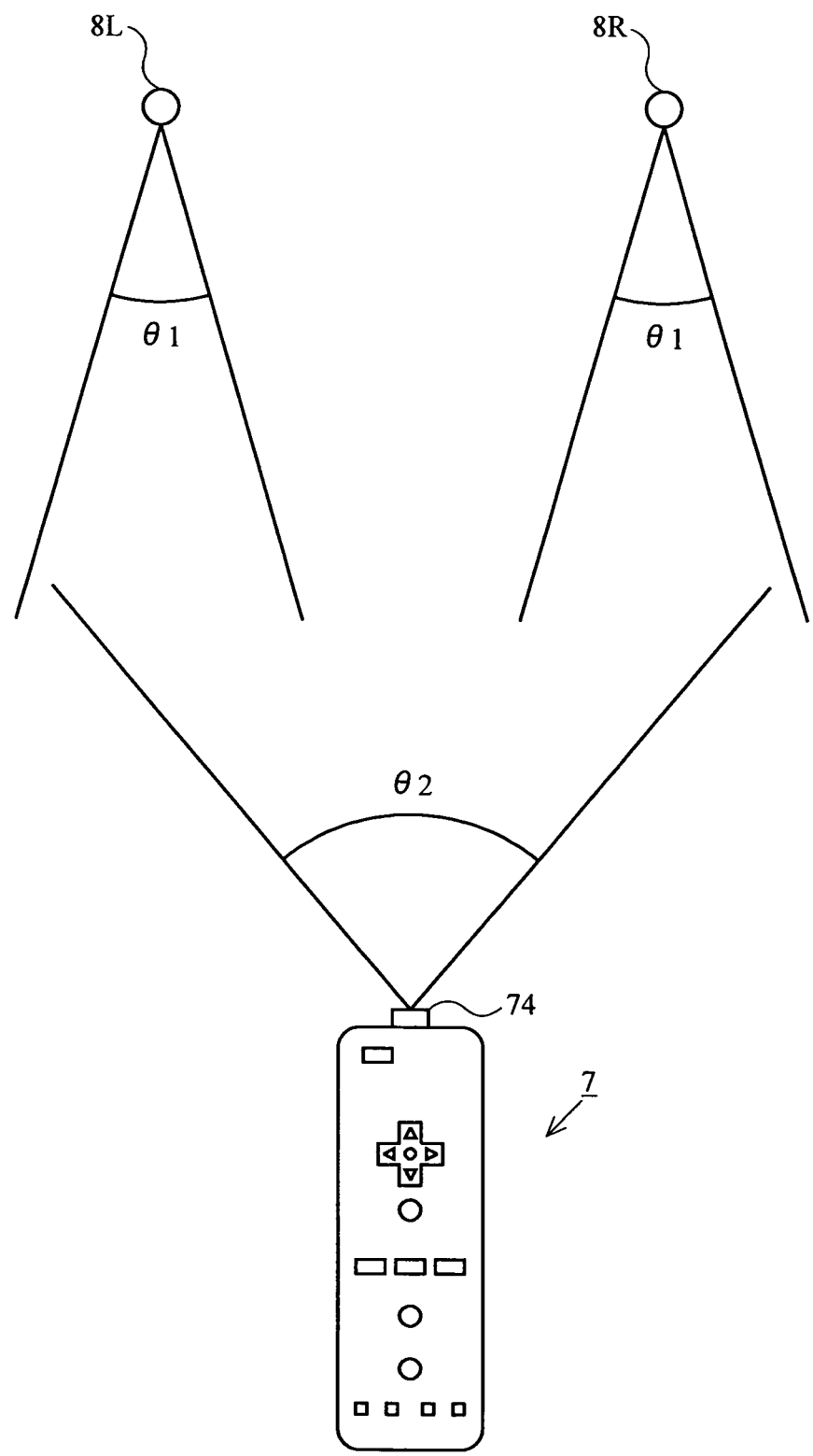
FIG. 10 is a diagram for describing visual field angles of marker 8L and 8R and an image capture information computing section 74.

Here, as illustrated in FIG. 10, the markers 8L and 8R each have a visual field angle of θ1. The image capturing element 743 has a visual field angle of θ2. For example, the visual field angle θ1 of each of the markers 8L and 8R is 34° (half value angle), and the visual field angle θ2 of the image capturing element 743 is 41°. When both the markers 8L and 8R are present within the visual field angle θ2 of the image capturing element 743, and the image capturing element 743 is present both within the visual field angle θ1 of the marker 8L and within the visual field angle θ1 of the marker 8R, the game apparatus 3 calculates a position indicated by the controller 7 with respect to the screen of the monitor 2 using position data of the high luminance points created by the two markers 8L and 8R.

For example, a case will be considered where the two markers 8L and 8R are provided on an upper surface of the monitor 2 (see FIG. 7), and the player points a center of the screen of the monitor 2 using the controller 7 with the upper surface facing upward (an image of the center of the screen is captured at a center of an image captured by the image capture information computing section 74). In this case, in the captured image of the image capture information computing section 74, the position of a middle point between target images of the image captured targets (a middle point between the markers 8L and 8R) does not coincide with a pointed position (the center of the screen). Specifically, the positions of the target images in the captured image are located above the center of the captured image. A reference position is set so that, when the target images are located at such positions, the center of the screen is assumed to be pointed. Also, the positions of the target images in the captured image move, corresponding to a movement of the controller 7 (their movement directions are opposite to each other). Therefore, by performing a process of moving a position pointed out in the screen, corresponding to the movement of the positions of the target images in the captured image, the position pointed out by the controller 7 on the screen can be obtained. In other words, based on the captured image of the image capture information computing section 74, a screen position directly pointed out by the controller 7 can be obtained. An essential principle of the process of calculating a position pointed out by the controller 7 is that a displacement of a pointed two-dimensional coordinate point from the predetermined reference position is calculated from a change in the positions of the target images due to a movement of the controller 7, to set input coordinates. Therefore, the controller 7 functions as a pointing device which outputs input coordinates based on the screen coordinate system of the monitor 2.

Here, regarding setting of the reference position, the player may previously point out a predetermined position on the screen using the controller 7, and the positions of the target images at that time may be stored in association with the predetermined position which is a reference, or if a positional relationship between the target images and the screen is fixed, the reference position may be previously set. Input coordinates pointed out by the controller 7 in the screen coordinate system are calculated using a function for calculating coordinates (screen coordinate data Db1) on the screen of the monitor 2 from position coordinates (first coordinate data Da1 and second coordinate data Da2 described below) of the target images. The function converts values of position coordinates calculated from some captured image into coordinates of a position on the screen pointed out by the controller 7 when the captured image is captured. By the function, a pointed position on the screen can be calculated from the coordinates of the image captured targets. Note that, when input coordinates in the screen coordinate system are converted into coordinates indicating a position in a game space, the input coordinates may be converted into a position in the game space corresponding thereto.

However, when the player points out the center of the screen of the monitor 2 using the controller 7 with the upper surface facing in a direction other than an upward direction (e.g., a rightward direction), the positions of the target images in the captured image are departed in a direction other than an upward direction (e.g., a leftward direction) from the center of the captured image. In other words, due to the tilt of the controller 7, the movement direction of the controller 7 may not coincide with the movement direction of the pointed position on the screen. Therefore, the position of the middle point between the two target images is corrected based on a direction connecting the two target images. Specifically, the middle point position is corrected into a middle point position when it is assumed that the upper surface of the controller 7 is caused to face upward. More specifically, when the reference position is set, a reference for the direction connecting the two target images is also set, and the coordinates of the middle point position are corrected by a rotation about the center of the captured image as an axis in an amount corresponding to an angle difference between the direction connecting the two target images and the reference direction. Thereafter, the corrected middle point position is used to calculate the pointed position as described above.

Figure 11:
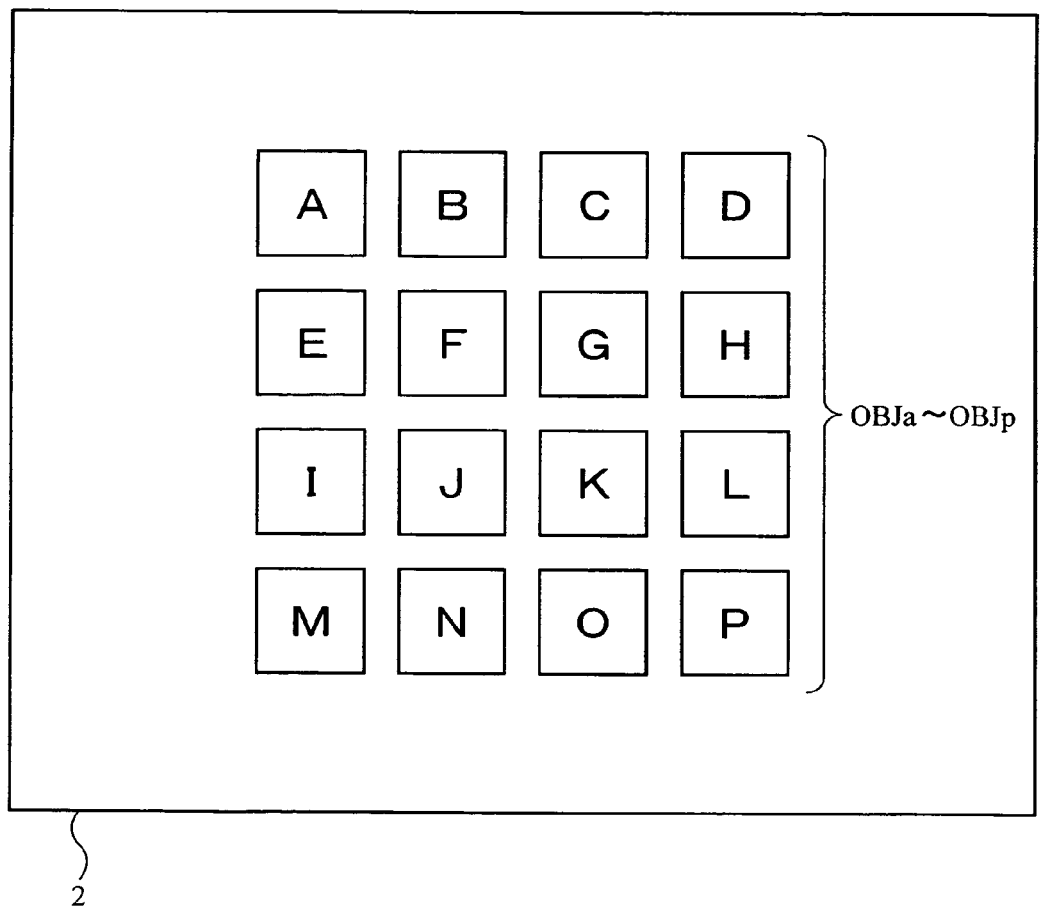
FIG. 11 is a diagram illustrating an exemplary set of a plurality of key objects OBJa to OBJp displayed on a monitor 2.
Figure 12:
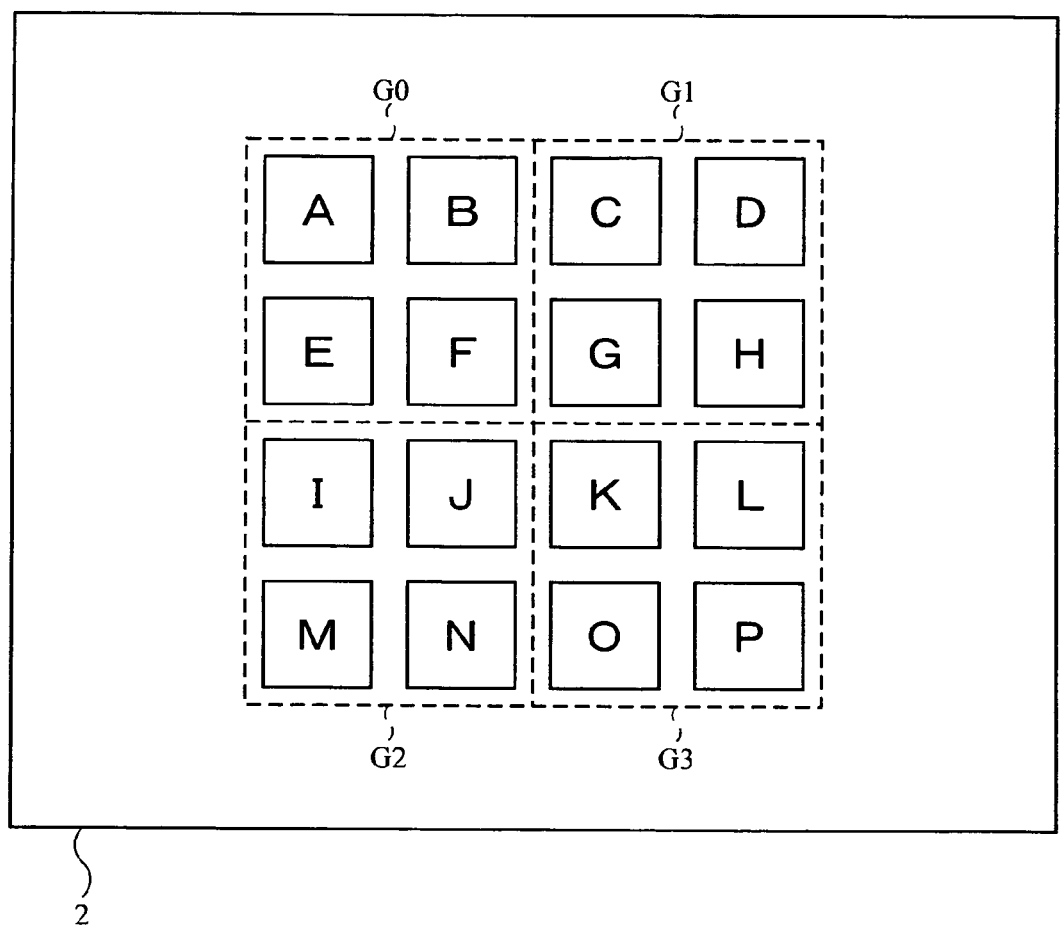
FIG. 12 is a diagram for describing a state in which the key objects OBJa to OBJp of FIG. 11 are divided into four groups G0 to G3.
Figure 21:
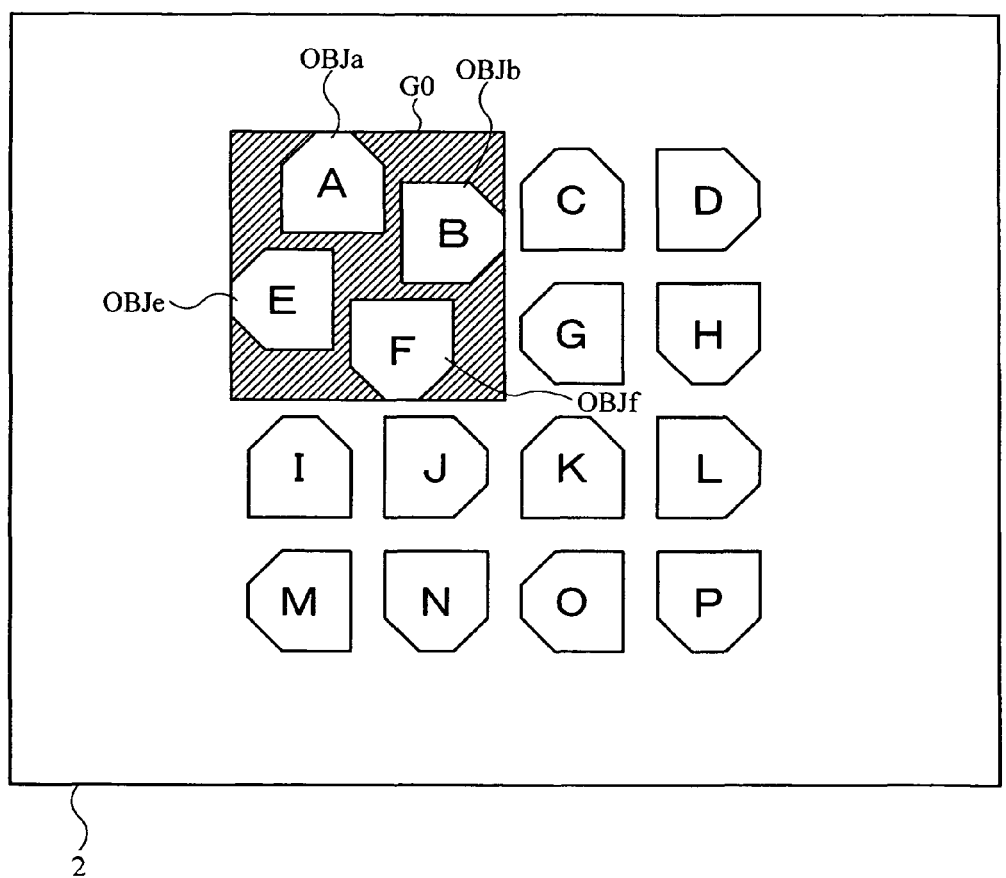
FIG. 21 is a diagram illustrating a second example displayed on the monitor 2 when the group G0 of FIG. 19 is pointed out by the controller 7.

Next, before a specific process performed by the game apparatus 3 is described, a subject selecting process provided by the game apparatus 3 which executes a game program will be described with reference to FIGS. 11 to 21 for easy understanding of the exemplary embodiments described herein. Hereinafter, to specifically describe the exemplary embodiments, a keyboard on which a plurality of keys on which characters are written is displayed on the monitor 2, and an operation of selecting one from the plurality of keys as an input will be described as an example. In this case, subjects to be selected by the player are a plurality of keys arranged and displayed on the monitor 2. Note that FIG. 11 is a diagram illustrating an exemplary set of a plurality of key objects OBJa to OBJp displayed on the monitor 2. FIG. 12 is a diagram for describing a state in which the key objects OBJa to OBJp of FIG. 11 are divided into four groups G0 to G3. FIGS. 13 to 17 are diagrams illustrating first to fifth examples displayed on the monitor 2 when the group G0 of FIG. 12 is pointed out by the controller 7. FIG. 18 is a diagram illustrating another exemplary set of a plurality of key objects OBJa to OBJp displayed on the monitor 2. FIG. 19 is a diagram for describing a state in which the key objects OBJa to OBJp of FIG. 18 are divided into four groups G0 to G3. FIGS. 20 and 21 are diagrams illustrating first and second examples displayed on the monitor 2 when the group G0 of FIG. 19 is pointed out by the controller 7.

In FIG. 11, the sixteen key objects OBJa to OBJp are arranged in an array of 4×4, so that a virtual keyboard (software keyboard) in which a plurality of keys are arranged is displayed on the monitor 2. For example, the player selects any of the key objects OBJa to OBJp using the controller 7 to input a character (key character) written on the selected one of the key objects OBJa to OBJp. Specifically, a key character "A" is written on the key object OBJa, a key character "B" is written on the key object OBJb, a key character "C" is written on the key object OBJc, a key character "D" is written on the key object OBJd, a key character "E" is written on the key object OBJe, a key character "F" is written on the key object OBJf, a key character "G" is written on the key object OBJg, a key character "H" is written on the key object OBJh, a key character "I" is written on the key object OBJi, a key character "J" is written on the key object OBJj, a key character "K" is written on the key object OBJk, a key character "L" is written on the key object OBJl, a key character "M" is written on the key object OBJm, a key character "N" is written on the key object OBJn, a key character "O" is written on the key object OBJo, and a key character "P" is written on the key object OBJp. The key objects OBJa to OBJd are arranged in this order from the left on the first row of the 4×4 array, the key objects OBJe to OBJh are arranged in this order from the left on the second row, the key objects OBJi to OBJl are arranged in this order from the left on the third row, and the key objects OBJm to OBJp are arranged in this order from the left on the fourth row.

In FIG. 12, the sixteen key objects OBJa to OBJp are divided into four groups G0 to G3 (indicated by dashed lines in FIG. 12, which do not need to be displayed on the monitor 2), each group including 2×2 objects. Specifically, the group G0 is composed of the four key objects OBJa, OBJb, OBJe and OBJf. The group G1 is composed of the four key objects OBJc, OBJd, OBJg and OBJh. The group G2 is composed of the four key objects OBJi, OBJj, OBJm and OBJn. The group G3 is composed of the four key objects OBJk, OBJl, OBJo and OBJp.

Figure 13:
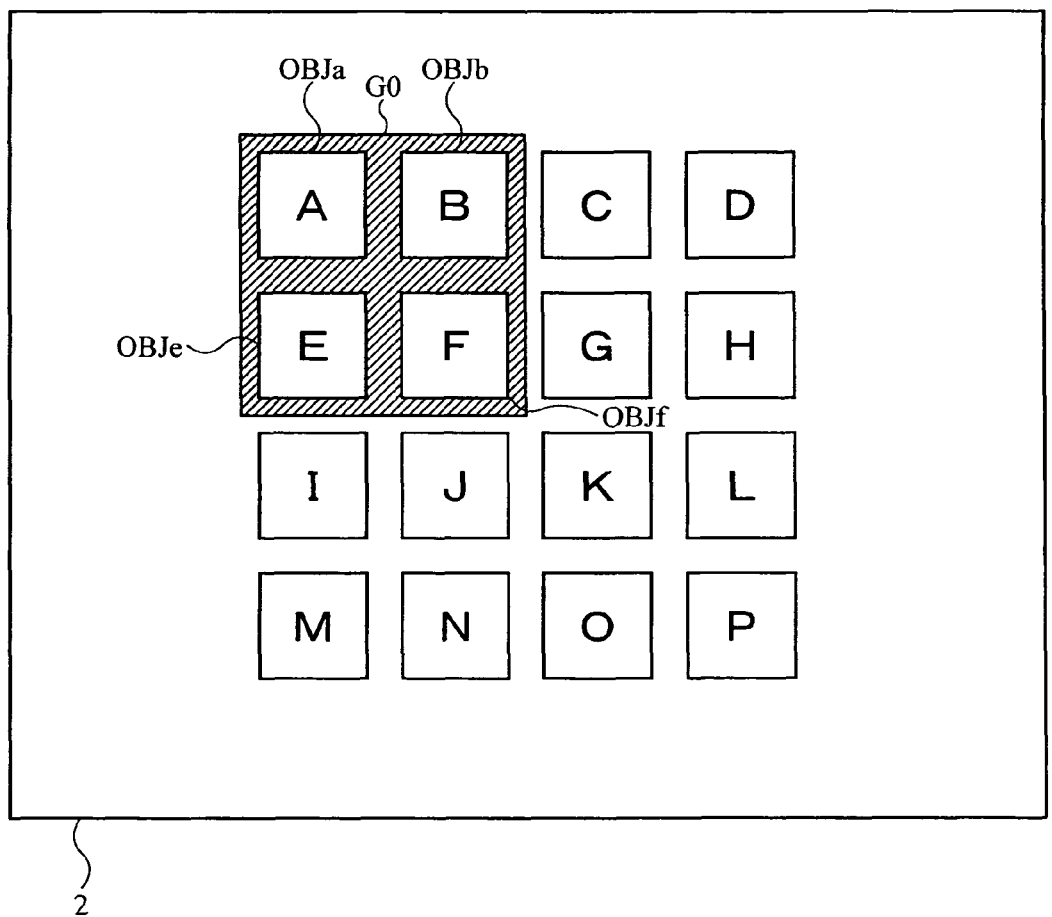
FIG. 13 is a diagram illustrating a first example displayed on the monitor 2 when the group G0 of FIG. 12 is pointed out by the controller 7.

When input coordinates in the screen coordinate system which are pointed out by the player using the controller 7 are present within an area indicating any of the groups G0 to G3, a group including the pointed area is expressed and distinguished from the other groups on the monitor 2. For example, as illustrated in FIG. 13, when the input coordinates in the screen coordinate system which are pointed out by the player using the controller 7 are present within an area indicating the group G0, only the group G0 is highlighted (hatched in FIG. 13). Thereby, the player can recognize a group pointed out by the controller 7 held by himself or herself, i.e., a group selected by the player (hereinafter referred to as a selected group G). Examples of highlighted display include: a change in color of the area indicated by the selected group G; a frame around the area indicated by the selected group G; position arrangement shift, size enlargement, or color change of the key objects belonging to the selected group G (the key objects OBJa, OBJb, OBJe and OBJf in FIG. 13); marking of the key objects belonging to the selected group G; enlargement, character thickening, or color change of the key characters written on the key objects belonging to the selected group G; and the like. In certain exemplary embodiments, a highlighted display may be achieved by any expression method.

Also, in this example, a relationship between the key objects belonging to the selected group G and an operation section provided in the controller 7 is displayed so that the player can recognize the relationship. Here, the operation section indicates a key or a button of the controller 7 which outputs an operation signal when a head portion thereof is pushed down by the player. Specifically, the operation section is the cross key 72a (an exemplary direction designating key) or the operation buttons 72b to 72g (see FIGS. 3 and 4). When the player operates the operation section of the controller 7, one key object corresponding to the operation is selected, and a key character written on the selected key object is determined as an input.

FIGS. 14 and 15 illustrate exemplary displays which allow the player to recognize a relationship between the key objects of the selected group G and the cross key 72a of the controller 7. In FIG. 14, the key objects OBJa, OBJb, OBJe and OBJf belonging to the selected group G0 are shifted to respective positions so as to mimic the upward and downward directions and the rightward and leftward directions of the cross key 72a, thereby displaying the relationship between each object and the cross key 72a. As can be seen from comparison of FIGS. 13 and 14, the key objects OBJa, OBJb, OBJe and OBJf are shifted in the upward and downward directions and the rightward and leftward directions. Thereby, a correspondence relationship between the four projecting pieces formed at intervals of 90° of the cross key 72a, and the key objects OBJa, OBJb, OBJe and OBJf can be recognized. Specifically, the key object OBJa is shifted to an uppermost position of the group G0, so that it is recognized that the key object OBJa corresponds to the upward projecting piece of the cross key 72a. The key object OBJb is shifted to a rightmost position of the group G0, so that it is recognized that the key object OBJb corresponds to the rightward projecting piece of the cross key 72a. The key object OBJe is shifted to a leftmost position of the group G0, so that it is recognized that the key object OBJe corresponds to the leftmost projecting piece of the cross key 72a. The key object OBJf is shifted to a lowermost position of the group G0, so that it is recognized that the key object OBJf corresponds to the downward projecting piece of the cross key 72a.

In FIG. 15, the key objects OBJa, OBJb, OBJe and OBJf belonging to the selected group G0 are assigned arrow marks Au, Ad, Al and Ar with which the upward, downward, leftward and rightward directions of the cross key 72a can be recognized, respectively, i.e., a relationship between each object and the cross key 72a is displayed. Thereby, a correspondence relationship between the four projecting pieces formed at intervals of 90° of the cross key 72a, and the key objects OBJa, OBJb, OBJe and OBJf can be recognized. Specifically, the key object OBJa is assigned the arrow mark Au indicating the upward direction, so that it is recognized the key object OBJa corresponds to the upward projecting piece of the cross key 72a. The key object OBJb is assigned the arrow mark Ar indicating the rightward direction, so that it is recognized the key object OBJb corresponds to the rightward projecting piece of the cross key 72a. The key object OBJe is assigned the arrow mark Al indicating the leftward direction, so that it is recognized the key object OBJe corresponds to the leftward projecting piece of the cross key 72a. The key object OBJf is assigned the arrow mark Ad indicating the downward direction, so that it is recognized the key object OBJd corresponds to the downward projecting piece of the cross key 72a.

FIGS. 16 and 17 illustrate exemplary displays which allow the player to recognize a relationship between the key objects belonging to the selected group G and the operation buttons 72b to 72g provided in the controller 7. In general, a game controller is provided with functions, such as an A button, a B button, an X button, a Y button, and the like, and symbols, such as a circle mark (○), a cross mark (x), a triangle mark (Δ), and a square mark (□), and the like. For example, the operation buttons 72b to 72d of the controller 7 are assigned functions as the X button, the Y button, and the B button, and the operation button 72i is assigned a function as the A button. In FIG. 16, the key objects OBJa, OBJb, OBJe and OBJf belonging to the selected group G0 are assigned button marks Ba, Bb, Bx and By which allow the player to recognize the A button, the B button, the X button, and the Y button, respectively, i.e., a relationship between the objects and the operation buttons 72b to 72g is displayed. Thereby, a correspondence relationship between the operation buttons 72b to 72g and the key objects OBJa, OBJb, OBJe and OBJf can be recognized. Specifically, the key object OBJa is assigned the button mark Bx indicating the X button, so that it is recognized that the key object OBJa corresponds to the operation button 72b assigned the function of the X button. The key object OBJb is assigned the button mark Ba indicating the A button, so that it is recognized that the key object OBJb corresponds to the operation button 72i assigned the function of the A button. The key object OBJe is assigned the button mark By indicating the Y button, so that it is recognized that the key object OBJe corresponds to the operation button 72c assigned the function of the Y button. The key object OBJf is assigned the button mark Bb indicating the B button, so that it is recognized that the key object OBJf corresponds to the operation button 72d assigned the function of the B button.

In FIG. 17, the key objects OBJa, OBJb, OBJe and OBJf belonging to the selected group G0 are assigned button mark Br, Bc, Bt and Bs which allow the player to recognize the circle mark button, the cross mark button, the triangle mark button, and the square mark button, respectively, i.e., a relationship between the objects and the operation buttons is displayed. Thereby, a correspondence relationship between the operation buttons and the key objects OBJa, OBJb, OBJe and OBJf can be recognized. Specifically, the key object OBJa is assigned the button mark Bt indicating the triangle mark button, so that it is recognized that the key object OBJa corresponds to an operation button assigned a function of the triangle mark button. The key object OBJb is assigned the button mark Br indicating the circle mark button, so that it is recognized that the key object OBJb corresponds to an operation button assigned a function of the circle mark button.

The key object OBJe is assigned the button mark Bs indicating the square mark button, so that it is recognized that the key object OBJe corresponds to an operation button assigned a function of the square mark button. The key object OBJf is assigned the button mark Bc indicating the cross mark button, so that it is recognized that the key object OBJf corresponds to an operation button assigned a function of the cross mark button.

FIGS. 18 and 19 illustrate an exemplary display which allows the player to recognize a relationship between key objects and operation sections of the controller 7, by displaying the sixteen key objects OBJa to OBJp, depending on shapes of the operation sections. In FIGS. 18 and 19, the key characters written on the sixteen key objects OBJa to OBJp, the order of the 4×4 arrangement, and the four groups G0 to G3 into which the key objects OBJa to OBJp are divided, are similar to those of FIGS. 11 and 12, and will not be described in detail. The display form of FIG. 18 is different from that of FIG. 11 in that the shapes of the key objects OBJa to OBJp allow the player to previously recognize a correspondence between the key objects OBJa to OBJp and the four projecting pieces formed at intervals of 90° of the cross key 72a.

Specifically, the key objects OBJa, OBJc, OBJi and OBJk each have a figure which mimics the upward projecting piece of the cross key 72a (e.g., a polygonal figure tapering upward, etc.) and encloses a written key character. The key objects OBJb, OBJd, OBJj and OBJl each have a figure which mimics the rightward projecting piece of the cross key 72a (e.g., a polygonal figure tapering rightward, etc.) and encloses a written key character. The key objects OBJe, OBJg, OBJm and OBJo each have a figure which mimics the leftward projecting piece of the cross key 72a (e.g., a polygonal figure tapering leftward, etc.) and encloses a written key character. The key object OBJf, OBJh, OBJn and OBJp each have a figure which mimics the downward projecting piece of the cross key 72a (e.g., a polygonal figure tapering downward, etc.) and encloses a written key character.

When input coordinates in the screen coordinate system pointed out by the player using the controller 7 are present within an area indicating any of the groups G0 to G3, a group including the pointed area is displayed and distinguished from the other groups on the monitor 2 as in FIG. 13. For example, as illustrated in FIG. 20, when the input coordinates in the screen coordinate system pointed out by the player using the controller 7 are present within an area indicating the group G0, only the group G0 is highlighted (hatched in FIG. 20). Thereby, the player can recognize the selected group G pointed out by the controller 7 held by himself or herself. Note that examples of highlighted display are similar to those described with reference to FIG. 13, and will not be described in detail.

Here, as can be seen from FIG. 20, when the group G0 is highlighted, the four key objects OBJa, OBJb, OBJe and OBJf are displayed and distinguished from the other key objects. The key objects OBJa, OBJb, OBJe and OBJf are displayed as figures mimicking the upward, rightward, leftward and downward projecting pieces of the cross key 72a, respectively. When the other groups G1 to G3 are selected, these are similarly displayed and distinguished from the other key objects. Specifically, when any of the groups G0 to G3 is selected, the player can recognize that one key character can be input, depending on the operation direction of the cross key 72a.

Thus, the key objects OBJ are represented by figures mimicking the shapes of the operation sections, thereby making it possible to indicate a correspondence between one key object OBJ and an operation section when any of the groups G0 to G3 is selected. In addition, the selected key objects OBJ may be shifted and displayed so that the player can easily recognize operation directions. FIG. 21 illustrates an example in which the display form of FIG. 20 is provided with an additional display in which the selected four key objects OBJa, OBJb, OBJe and OBJf are shifted. As illustrated in FIG. 21, in the group G0, the key object OBJa is shifted to an uppermost position, the key object OBJb is shifted to a rightmost position, the key object OBJe is shifted to a leftmost position, and the key object OBJf is shifted to a lowermost position. Thereby, a correspondence between the projecting pieces indicating the upward, downward, leftward and rightward directions of the cross key 72a and the key objects OBJa, OBJb, OBJe and OBJf can be more clearly displayed.

Figure 22:
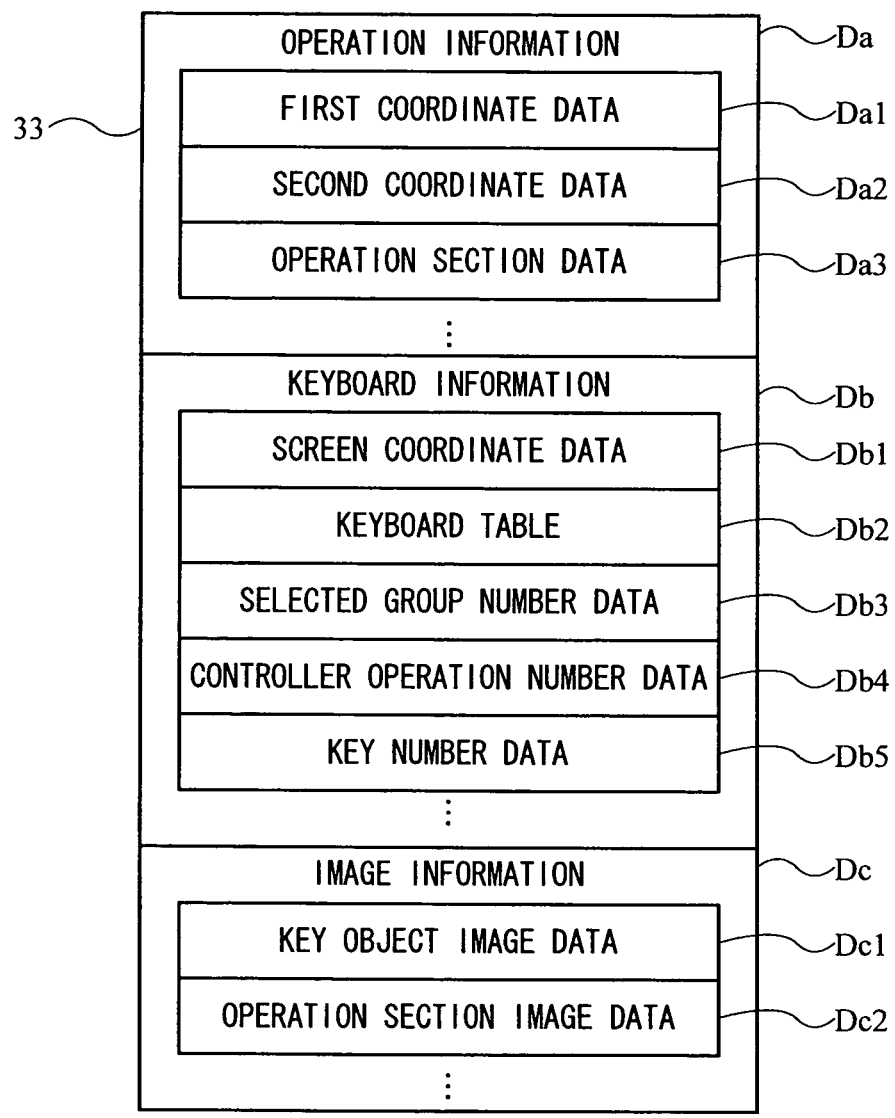
FIG. 22 is a diagram illustrating main data stored in a main memory 33 of the game apparatus 3.

Next, a game process performed in the game system 1 will be described in detail. Initially, main data used in the game process will be described with reference to FIGS. 22 to 24. Note that FIG. 22 is a diagram illustrating main data stored in the main memory 33 of the game apparatus 3. FIG. 23 is a diagram illustrating a relationship between key characters and key numbers. FIG. 24 is a diagram illustrating an exemplary keyboard table.

As illustrated in FIG. 22, the main memory 33 stores operation information Da, keyboard information Db, the image information Dc, and the like. Note that the main memory 33 stores various data required for a process in addition to data included in the information illustrated in FIG. 22, but will not be described in detail.

The operation information Da is a series of pieces of operation information transmitted as transmission data from the controller 7, and is updated into latest operation information. The operation information Da includes the first coordinate data Da1 and the second coordinate data Da2 corresponding to the above-described process result data. The first coordinate data Da1 is coordinate data indicating a position (a position in a captured image) of an image of one of the two markers 8L and 8R in an image captured by the image capturing element 743. The second coordinate data Da2 is coordinate data indicating a position (a position in the captured image) of an image of the other marker. For example, the position of the image of the marker is represented by an XY coordinate system in a captured image.

The operation information Da includes operation section data Da3 obtained from the operation section 72 and the like in addition to the exemplary coordinate data (the first coordinate data Da1 and the second coordinate data Da2) of process result data obtained from a captured image. Note that the reception unit 6 included in the game apparatus 3 receives the operation information Da transmitted in predetermined intervals of, for example, 5 ms from the controller 7, and the operation information Da is accumulated into a buffer (not shown) of the reception unit 6. Thereafter, the operation information Da is read out, for example, per frame (1/60 sec) which is a game process interval, and the latest information is stored into the main memory 33.

The keyboard information Db is information for defining a software keyboard with which the player inputs characters and the like, or information for calculating a key character selected by the player. The keyboard information Db includes screen coordinate data Db1, a keyboard table Db2, selected group number data Db3, controller operation number data Db4, key number data Db5, and the like. The screen coordinate data Db1 is data indicating input coordinates in the screen coordinate system of the monitor 2 which are obtained based on the first coordinate data Da1 and the second coordinate data Da2. The keyboard table Db2 is a data table indicating each piece of data defined on the software keyboard. The selected group number data Db3 is data indicating a group G selected by the controller 7. The controller operation number data Db4 is data indicating an operation section operated by the controller 7. The key number data Db5 is data indicating a key input determined by the player.

The image information Dc is data which includes key object image data Dc1, operation section image data Dc2, and the like, and is used to generate an image to be displayed on the monitor 2 in which the key object OBJ, a button image B, and the like are provided.

A relationship between key characters and key numbers kn will be described with reference to FIG. 23. In FIG. 23, the key numbers kn (=0 to 15) are successively assigned to the key characters ("A" to "P"), respectively. In other words, if a key number kn is determined, a key character is uniquely determined.

The keyboard table Db2 will be described with reference to FIG. 24. On the keyboard table Db2 of FIG. 24, address numbers tb, key numbers kn, key characters, group numbers gn, and controller operation numbers cn are described in association with each other. The key numbers kn and the key characters are associated with each other as described above and are described on the keyboard table Db2 in order of the key characters A to P, corresponding to the address numbers 0 to 15. The group numbers gn are data indicating a group G to which each key character (key number kn) belongs. For example, when there are four groups G0 to G3 as described above, the groups G0 to G3 are described on the keyboard table Db2, corresponding to the group numbers gn (=0 to 3), respectively. The controller operation numbers cn are data indicating operation sections corresponding to the respective key characters (key numbers kn). For example, when the controller operation numbers cn are associated with the four projecting pieces formed at intervals of 90° of the cross key 72a, the controller operation numbers cn (=0 to 3) are described on the keyboard table Db2, corresponding to the upward direction (cn=0), the rightward direction (cn=1), the leftward direction (cn=2), and the downward direction (cn=3), respectively. Therefore, by referencing the keyboard table Db2, the key number, the belonging group and the corresponding operation section of each key character are known. For example, a set of the address number tb=0, the key number kn=0, the key character="A", the group number gn=0, and the controller operation number cn=0, is described on the keyboard table Db2, so that it is known that the key character "A" described in the address number 0 is assigned to the key number kn=0, belongs to the group G0, and corresponds to the upward projecting piece of the cross key 72a. Note that data indicating a display range of each of the groups G0 to G3 may be described on the keyboard table Db2.

Next, a process performed in the game apparatus 3 will be described in detail with reference to FIG. 25. Note that FIG.

25 is a flowchart of the process executed in the game apparatus 3. Note that, in the flowchart of FIG. 25, of the whole process, a process (subject selecting process) of obtaining one key number by executing a subject selecting program included in a game program will be described, and other processes which are not directly involved with certain exemplary embodiments will not be described in detail. In FIG. 25, each step executed by the CPU 30 is abbreviated as "S".

When the game apparatus 3 is powered ON, the CPU 30 of the game apparatus 3 executes a boot program stored in a boot ROM (not shown) to initialize each unit, such as a main memory 33 and the like. Thereafter, a game program (subject selecting program) stored on the optical disc 4 is read into the main memory 33, and execution of the game program is started by the CPU 30. The flowchart of FIG. 25 indicates a process performed after the above-described process is completed.

Figure 25:
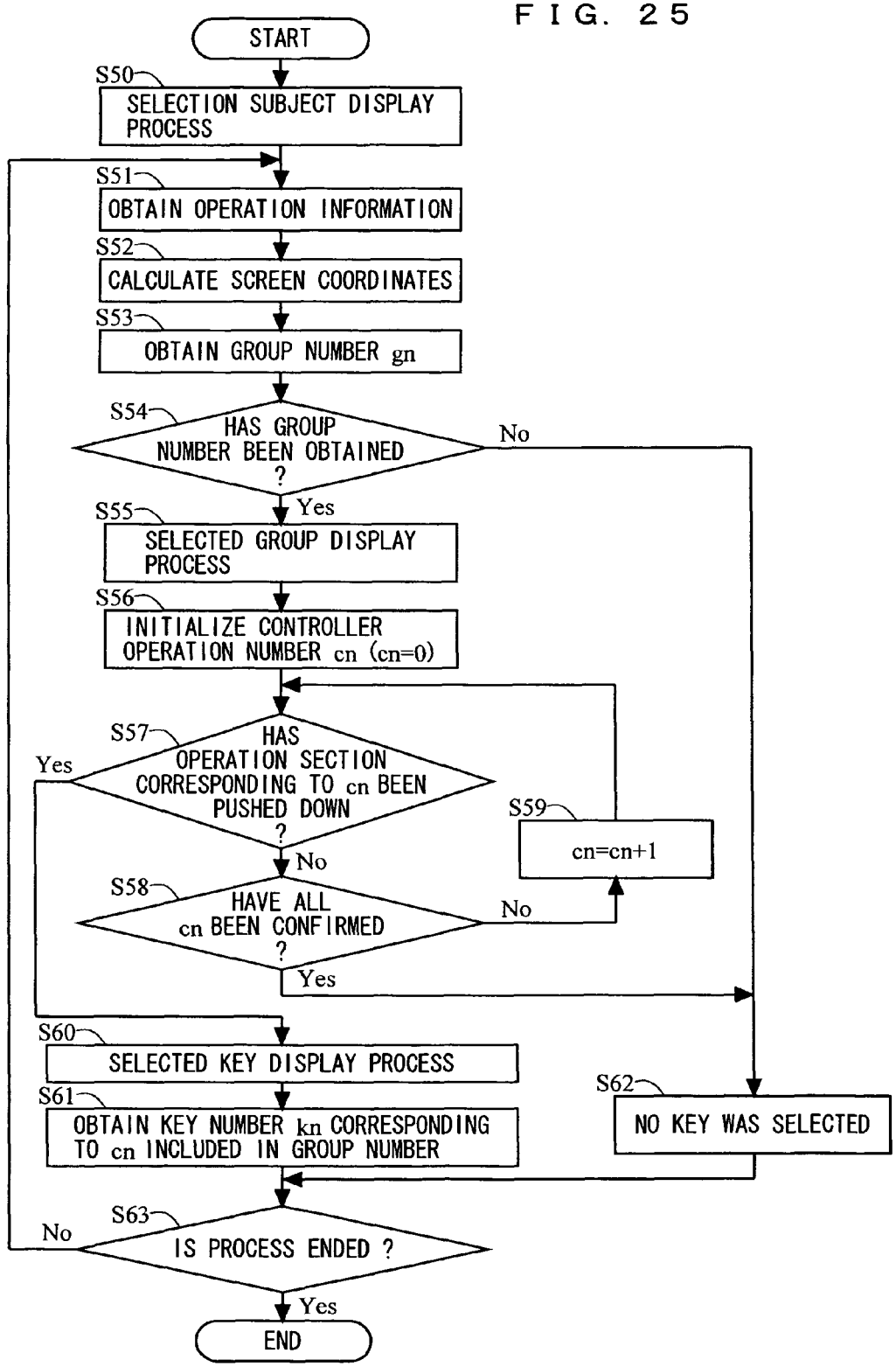
FIG. 25 is a flowchart of a process executed in the game apparatus 3.

In FIG. 25, the CPU 30 performs a process (step 50) of displaying a plurality of selection subjects (e.g., the key objects OBJa to OBJp) which are divided into groups on the monitor 2 as described above, and goes to the next step. The selection subject displaying process is a process of displaying, on the monitor 2, selection subjects which prompt the player to select. For example, displays as described with reference to FIGS. 11, 12, 18 and 19 are displayed on the monitor 2.

Next, the CPU 30 obtains operation information received from the controller 7 (step 51). The CPU 30 stores the operation information as the operation information Da into the main memory 33, and goes to the next step. Here, the operation information obtained in step 51 includes data indicating how the operation section 72 of the controller 7 has been operated (the operation section data Da3) in addition to coordinate data indicating positions of the markers 8L and 8R in a captured image (the first coordinate data Da1 and the second coordinate data Da2). Here, the communication section 75 transmits the operation information to the game apparatus 3 in predetermined time intervals (e.g., a 5-ms interval). The CPU 30 is assumed to utilize the operation information per frame. Therefore, a process loop of steps 51 to 63 of FIG. 25 is repeatedly executed per frame.

Next, the CPU 30 calculates input coordinates in the screen coordinate system of the monitor 2 based on the operation information obtained in step 51 (step 52). Thereafter, the CPU 30 stores the calculated input coordinates as the screen coordinate data Db1 into the main memory 33, and goes to the next step. Specifically, the input coordinates are calculated based on the first coordinate data Da1 and the second coordinate data Da2 obtained in step 51. The principle of the process of calculating the input coordinates is that a displacement from a predetermined reference position (two-dimensional coordinates) pointed out due to a change in the positions of the target images caused by movement of the controller 7, is calculated to set the input coordinates. Since the principle is similar to that described above, and will not be described in detail.

Next, the CPU 30 obtains a selected group G from the input coordinates calculated in step 52, and obtains a group number gn indicating the selected group G (step 53). Thereafter, the CPU 30 stores the obtained group number gn as the selected group number data Db3 into the main memory 33, and goes to the next step. For example, the CPU 30 uses the input coordinates and the display ranges of the groups G0 to G3 to extract a display range including the input coordinates. Thereafter, the CPU 30 determines one of the groups G0 to G3 which has the extracted display range, as a selected group G, and obtains a group number gn indicating the selected group G.

Next, the CPU 30 determines whether or not a group number gn has been obtained in step 53 (step 54). When a group number gn has been obtained, the CPU 30 goes to the next step 55. On the other hand, when a group number gn has not been obtained (e.g., the controller 7 points out the outside of the display ranges of the groups G0 to G3, etc.), the CPU 30 goes to the next step 62.

In step 55, the CPU 30 performs a selected group displaying process, and goes to the next step. The selected group displaying process refers to a process of displaying a group including an area pointed out by the player using the controller 7 on the monitor 2, distinguishing the group from the other groups. For example, when the group G0 is pointed out and selected, a display as described with reference to FIGS. 13 to 17 and FIGS. 20 and 21 is displayed on the monitor 2.

Next, the CPU 30 initializes the controller operation number cn described in the controller operation number data Db4 to cn=0 (step 56), and goes to the next step.

Next, the CPU 30 determines whether or not an operation section of the controller 7 corresponding to a current controller operation number cn described in the controller operation number data Db4 has been pushed down (step 57). Specifically, the CPU 30 determines whether or not an operation signal generated by pushing down an operation section 72 corresponding to the controller operation number cn has been obtained, by referencing the operation signal from the operation section 72 described in the operation section data Da3. When the operation section 72 corresponding to the controller operation number cn has been pushed down, the CPU 30 goes to the next step 60. On the other hand, when the operation section 72 corresponding to the controller operation number cn has not been pushed down, the CPU 30 goes to the next step 58.

In step 58, the CPU 30 determines whether or not the operations of operation sections 72 corresponding to all the controller operation numbers cn have been checked. Here, all the controller operation numbers cn indicate all of controller operation numbers cn described on the keyboard table Db2 (in the example of FIG. 24, the controller operation number cn=0 to 3). When all the controller operation numbers cn have been checked, the CPU 30 goes to the next step 62. When all the controller operation numbers cn have not been checked, the CPU 30 increments the controller operation number cn described in the controller operation number data Db4 by one (step 59), and returns to step 57, which is in turn repeated.

In step 60, the CPU 30 performs a selected key displaying process, and goes to the next step. The selected key displaying process is a process of displaying a key object OBJ on which a key character which is determined by the player using the operation section 72 of the controller 7 is written (hereinafter referred to as a selected key object OBJ) on the monitor 2, distinguishing the key object OBJ from the other key objects OBJ. For example, in step 60, only the selected key object OBJ is highlighted. Thereby, the player can recognize an input key determined by operating the operation section 72 of the controller 7 held by himself or herself. Examples of highlighted display include: a change in color of the selected key object OBJ; shift or enlargement of an arranged position of the selected key object OBJ; marking of the selected key object OBJ; enlargement, thickening or color change of the key character written on the selected key object OBJ; and the like. In certain exemplary embodiments, a highlighted display may be achieved by any expression method.

Next, the CPU 30 obtains a key number kn which is included in the group number gn described in the selected group number data Db3, and corresponds to the controller operation number cn described in the controller operation number data Db4, by referencing the keyboard table Db2 (step 61). Thereafter, the CPU 30 stores the obtained key number data Db5 into the main memory 33, and goes to the next step 63. As can be seen from the keyboard table Db2 of FIG. 24, if a group number gn and a controller operation number cn are determined, an address number tb and a key number kn corresponding thereto are uniquely determined. Specifically, a key number kn described in a calculated address number tb can be obtained using the following expression.

$$kn=tb[gn\times4+cn]$$

For example, when the group number gn=0 and the controller operation number cn=2, the address number tb=2 is calculated, so that the key number kn=4 is obtained.

Also, as can be seen from the relationship between the key characters and the key numbers kn which is described with reference to FIG. 23, if a key number kn is determined, one key character can be uniquely determined. Therefore, based on the key number kn thus determined, the CPU 30 can also determine a key character corresponding to the key number kn as an input character.

On the other hand, when a group number gn has not been obtained in step 53 (No in step 54) or when none of the operation sections 72 corresponding to all the controller operation numbers cn has been pushed down (Yes in step 58), the CPU 30 determines that no key has been selected (step 62), and goes to the next step 63.

In step 63, the CPU 30 determines whether or not the process is ended. When the process is continued, the CPU 30 returns to step 51, which is in turn repeated. When the process is ended, the process of the flowchart is ended.

Although it has been described above that the sixteen key objects OBJa to OBJp are divided into groups each including four key objects, each group may include other numbers of key objects. For example, when a mouse is used for operation, since the mouse is provided with left and right buttons, two key objects are grouped into one so as to provide grouping corresponding to the operation buttons, which is easier for the player to recognize.

FIG. 26 illustrates an example in which the sixteen key objects OBJa to OBJp are divided into eight groups G0 to G7 each including 1×2 objects (two objects). Specifically, the group G0 is composed of the key objects OBJa and OBJb, the group G1 is composed of the key objects OBJc and OBJd, the group G2 is composed of the key objects OBJe and OBJf, the group G3 is composed of the key objects OBJg and OBJh, the group G4 is composed of the key objects OBJi and OBJj, the group G5 is composed of the key objects OBJk and OBJl, the group G6 is composed of the key objects OBJm and OBJn, and the group G7 is composed of the key objects OBJo and OBJp. When input coordinates in the screen coordinate system which are pointed out by the player using the controller 7 are present within an area indicating any of the groups G0 to G7, the group including the pointed area is expressed and distinguished from the other groups on the monitor 2, as in FIG. 13. For example, as illustrated in FIG. 26, when the input coordinates in the screen coordinate system which are pointed out by the player using the controller 7 are present within an area indicating the group G0, only the group G0 is highlighted (hatched in FIG. 26). Thereby, the player can recognize the selected group G pointed out by the controller 7 held by himself or herself.

Here, as can be seen from FIG. 26, when the group G0 is highlighted, the two key objects OBJa and OBJb are displayed and distinguished from the other key objects. When a mouse is used to perform an operation, it is easily recognized that the two key objects OBJa and OBJb correspond to the left and right buttons of the mouse. Similarly, when the other groups G1 to G7 are selected, the selected group is displayed and distinguished from the other key objects. In other words, when any of the groups G0 to G7 is selected, the player can recognize that one key character can be input, depending on the left and right buttons of the mouse.

Figure 28:
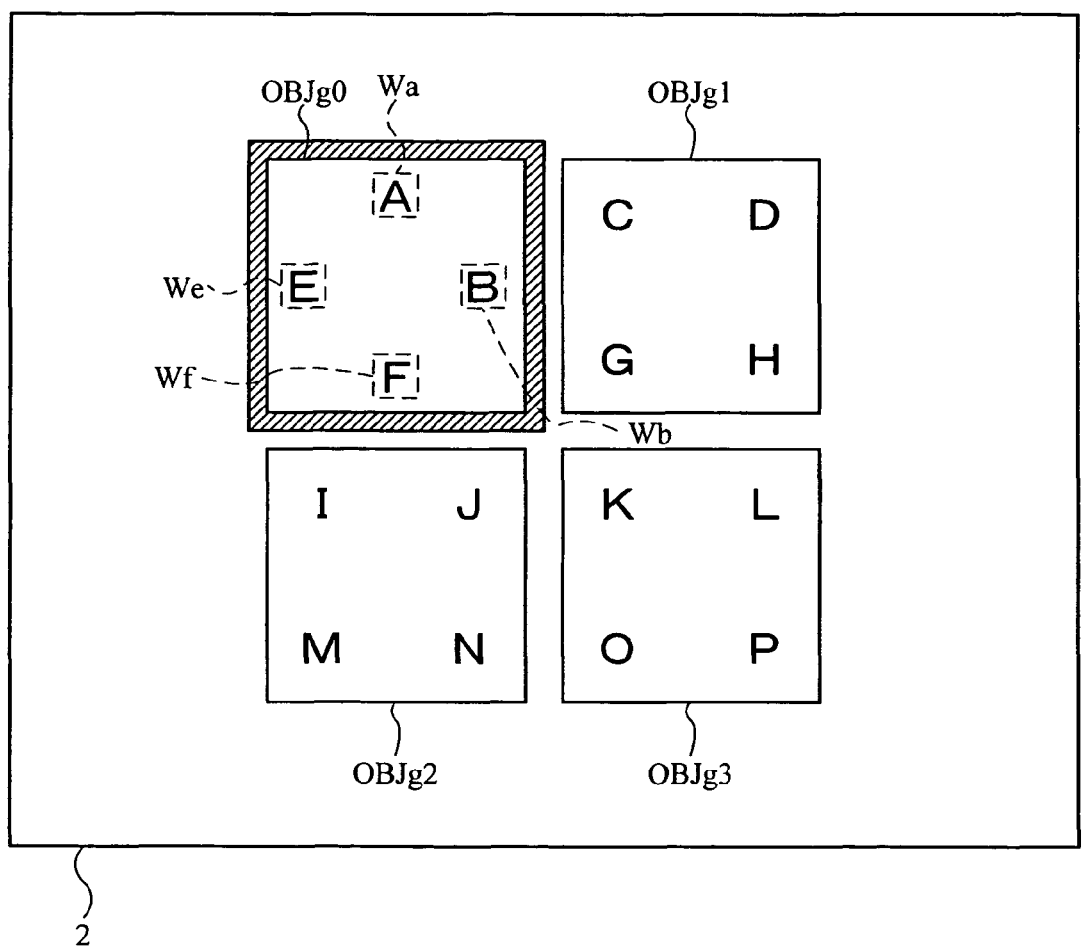
FIG. 28 is a diagram illustrating an exemplary display which is presented on the monitor 2 when an object OBJg0 is pointed out by the controller 7 in FIG. 27.

Although it has been described above that the player selects one from a plurality of objects (specifically, key objects) displayed on the monitor 2 (i.e., the objects are selection subjects), other displayed objects may be used as selection subjects. FIG. 27 is a diagram illustrating an exemplary display which is presented on the monitor 2 when displayed key characters W are selection subjects. FIG. 28 is a diagram illustrating an exemplary display which is presented on the monitor 2 when an object OBJg0 is pointed out by the controller 7 in FIG. 27.

In FIG. 27, sixteen characters Wa to Wp are arranged in an array of 4×4. Here, the key characters Wa to Wp are divided into four groups each including four (2×2) key characters W. The key characters W belonging to each group are described in the 2×2 group key objects OBJg0 to OBJg3. A virtual keyboard (software keyboard) in which the group key objects OBJg0 to OBJg3 are arranged and a plurality of key characters W are arranged therein, is displayed on the monitor 2. For example, after the player selects any of the group key objects OBJg0 to OBJg3 using the controller 7, any of key characters W included in the selected group is selected, thereby making it possible to input the selected key character W.

Specifically, a key character "A" is written on the key character Wa, a key character "B" is written on the key character Wb, a key character "C" is written on the key character Wc, a key character "D" is written on the key character Wd, a key character "E" is written on the key character We, a key character "F" is written on the key character Wf, a key character "G" is written on the key character Wg, a key character "h" is written on the key character Wh, a key character "J" is written on the key character Wj, a key character "K" is written on the key character Wk, a key character "L" is written on the key character Wl, a key character "M" is written on the key character Wm, a key character "N" is written on the key character Wn, a key character "0" is written on the key character Wo, and a key character "P" is written on the key character Wp. The four key characters Wa, Wb, We and Wf are described in the group key object OBJg0. The four key characters Wc, Wd, Wg and Wh are described in the group key object OBJg1. The four key characters Wi, Wj, Wm and Wn are described in the group key object OBJg2. The four key characters Wk, Wl, Wo and Wp are described in the group key object OBJg3. In other words, the group key objects OBJg0 to OBJg3 indicate groups to which the key characters W (selection subjects) belong.

When input coordinates in the screen coordinate system which are pointed out by the player using the controller 7 are present within an area indicating any of the group key objects OBJg0 to OBJg3, the pointed group key object is expressed and distinguished from the other group key objects on the monitor 2. For example, as illustrated in FIG. 28, when the input coordinates in the screen coordinate system which are pointed out by the player using the controller 7 are present within an area indicating the group key object OBJg0, only the group key object OBJg0 is highlighted (hatched in FIG. 28). Thereby, the player can recognize a group key object which is pointed out by the controller 7 held by himself or herself, i.e., a group key object selected by the player (hereinafter also be referred to as a selected group key object OBJg). Examples of highlighted display include: a change in color of the inside or outer frame of the selected group key object OBJg; position arrangement shift, size enlargement, thickening, and color change of the key characters W (the key characters Wa, Wb, We and Wf of FIG. 28) belonging to the selected group key object OBJg; marking of the selected group key object OBJg; and the like. In certain exemplary embodiments, highlighting may be achieved by any expression method.

Also, a display is performed so as to recognize a relationship between key objects belonging to the selected group key object OBJg and an operation section provided in the controller 7. Thereafter, the player operates an operation section of the controller 7, so that a key character W corresponding to the operation is selected, and the selected key character W is determined as an input.

In FIG. 28, the key characters Wa, Wb, We and Wf belonging to the selected group key object OBJg0 are shifted to positions mimicking the upward, downward, leftward and rightward directions of the cross key 72a, respectively, thereby displaying a relationship between each object and the cross key 72a. As can be seen from comparison of FIGS. 27 and 28, the key characters Wa, Wb, We and Wf are shifted in the upward, downward, leftward and rightward directions, respectively. Thereby, a correspondence relationship between the four projecting pieces formed at intervals of 90° of the cross key 72a and the key characters Wa, Wb, We and Wf, can be recognized. Specifically, the key character Wa is shifted to an uppermost position of the group key object OBJg0, so that it is recognized that the key character Wa corresponds to the upward projecting piece of the cross key 72a. The key character Wb is shifted to an rightmost position of the group key object OBJg0, so that it is recognized that the key character Wb corresponds to the rightward projecting piece of the cross key 72a. The key character We is shifted to a leftmost position of the group key object OBJg0, so that it is recognized that the key character We corresponds to the leftward projecting piece of the cross key 72a. The key character Wf is shifted to a lowermost position of the group key object OBJg0, so that it is recognized that the key character Wf corresponds to the downward projecting piece of the cross key 72a.

Although it has been described above that the controller 7 or a mouse is used as an exemplary pointing device for selecting a group to which selection subjects belong, other pointing devices may be used. An example in which certain exemplary embodiments are implemented using a touch panel as a pointing device, will be described with reference to FIG. 29. Note that FIG. 29 is a diagram illustrating an external appearance of a hand-held game apparatus 10 which executes a game program including the subject selecting program of the certain exemplary embodiments.

Figure 29:
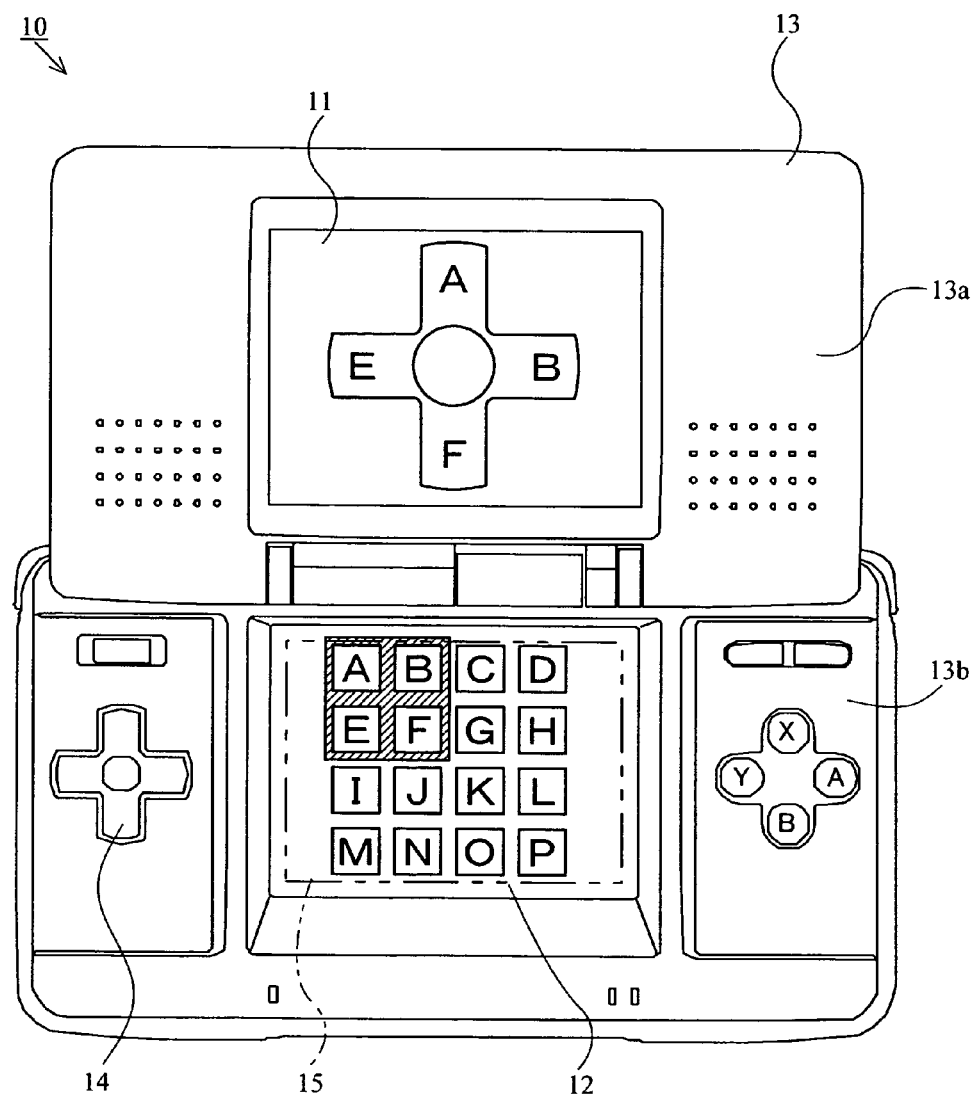
FIG. 29 is a diagram illustrating an external appearance of a hand-held game apparatus 10 which executes a game program including a subject selecting program of an exemplary embodiment.

In FIG. 29, the hand-held game apparatus 10 includes a first LCD (Liquid Crystal Display) 11 and a second LCD 12. A housing 13 is composed of an upper housing 13a and a lower housing 13b. The first LCD 11 is housed in the upper housing 13a, and the second LCD 12 is housed in the lower housing 13b. A memory card is attached to the hand-held game apparatus 10. The memory card is a storage medium which stores a game program or the like, and is detachably attached into an insertion opening provided in the lower housing 13b.

In the lower housing 13b, an operation section 14 including input devices, such as a cross switch, a start switch, a select switch, an A button, a B button, an X button, a Y button, a power supply switch, an L button, an R button, and the like, is provided. Also, as an additional input device, a touch panel 15 is mounted on a screen of the second LCD 12.

The touch panel 15 may be of any type including, for example, a resistance film type, an optical (infrared) type, and an electrostatic capacitance coupling type, and the like. The touch panel 15 is an exemplary pointing device which has a function of outputting coordinate data corresponding to a touch position when a surface of the touch panel 15 is touched.

On the second LCD 12, sixteen key objects are arranged in an array of 4×4 as in FIG. 11, so that a virtual keyboard (software keyboard) in which a plurality of keys are arranged is displayed. The sixteen key objects are divided into four groups each including four (2×2) objects as in FIG. 12.

When the player performs a touch operation with respect to the touch panel 15, input coordinates in a coordinate system of the touch panel thus touched are converted into input coordinates in a screen coordinate system of the second LCD 12. When the input coordinates in the screen coordinate system are present within an area indicating any of the groups, a group including the area is expressed and distinguished from the other groups on the second LCD 12. In the example of FIG. 29, a group composed of key objects on which characters "A", "B", "E" and "F" are written, is highlighted.

A display which allows the player to recognize a relationship between key objects belonging to a selected group and an operation section 14 provided in the lower housing 13b is displayed on, for example, the first LCD 11. For example, an enlarged figure mimicking the corresponding operation section 14 (a cross key in the example of FIG. 29) is drawn on the first LCD 11. The characters written on the key objects belonging to the selected group are assigned to the figure displayed on the first LCD 11, thereby indicating a relationship between each key object and the operation section 14. In the example of FIG. 29, a relationship between the cross key and the selected four key objects is displayed. Thereby, a correspondence relationship between the four projecting pieces formed at intervals of 90° of the cross key and the key objects can be recognized. Specifically, the key character "A" is assigned to and displayed on the upward projecting piece of the mimicking figure, so that it can be recognized that the key object on which the key character "A" is written corresponds to the upward projecting piece of the cross key. The key character "B" is assigned to and displayed on the rightward projecting piece of the mimicking figure, so that it can be recognized that the key object on which the key character "B" is written corresponds to the rightward projecting piece of the cross key. The key character "E" is assigned to and displayed on the leftward projecting piece of the mimicking figure, so that it can be recognized that the key object on which the key character "E" is written corresponds to the leftward projecting piece of the cross key. The key character "F" is assigned to and displayed on the downward projecting piece of the mimicking figure, so that it can be recognized that the key object on which the key character "F" is written corresponds to the downward projecting piece of the cross key.

Thus, according to the subject selecting apparatus of this embodiment, a plurality of selection subjects (key objects, key characters, etc.) are divided into groups under predetermined conditions, and any of the resultant groups is selected using a pointing device. Thereafter, selection subjects in the selected group are associated with operation sections, such as input keys, input buttons, or the like, and a desired selection subject can be selected by operating a corresponding operation section. Therefore, in a case where it is difficult to select individual selection subjects using pointing devices, a plurality of selection subjects are divided into groups, thereby obtaining relatively large selection subjects. Therefore, it is easy to select any of selection subjects having relatively large selection areas. The selection subject groups are displayed and any of them can be directly selected using a pointing device, so that a selecting operation can be intuitively performed by the user. Also, since any of the groups is selected using a pointing device and any of individual selection subjects included in the group is selected using an operation section, thereby making it possible to efficiently select a desired selection subject. In this case, operation sections to be operated are displayed for the user so as to select one selection subject, thereby making it possible to clearly indicating an operation for selecting a selection subject. Also, the groups into which the selection subjects are divided can be reduced to a level which allows any of the groups to be selected using a pointing device, so that the selection subjects can be displayed even in a size which makes it difficult to select any of the individual selection subjects using a pointing device, thereby making it possible to efficiently utilize an area indicating a selection subject.

Although it has been described above that image data captured by the image capturing element 743 is analyzed to obtain position coordinates, center-of-gravity coordinates thereof, and the like of infrared light from the markers 8L and 8R, and these are generated as process result data in the controller 7 and are transmitted to the game apparatus 3, data in other process stages may be transmitted form the controller 7 to the game apparatus 3. For example, image data captured by the image capturing element 743 may be transmitted from the controller 7 to the game apparatus 3, and may be subjected to the analysis process in the CPU 30 to obtain process result data. In this case, the image processing circuit 744 provided in the controller 7 is no longer required. Also, data obtained partway through analysis of the image data may be transmitted from the controller 7 to the game apparatus 3. For example, data indicating a luminance, a position, an area, and the like obtained from the image data may be transmitted from the controller 7 to the game apparatus 3, and the remaining analysis process may be performed in the CPU 30 to obtain process result data.

Although it has been described above that the controller 7 and the game apparatus 3 are connected via wireless communication, the controller 7 and the game apparatus 3 may be electrically connected via a cable. In this case, a cable connected to the controller 7 is connected to a connection terminal of the game apparatus 3.

Although it has been described above that the reception unit 6 connected to the connection terminal of the game apparatus 3 is used as a reception means for receiving transmission data wirelessly transmitted from the controller 7, the reception means may be configured using a reception module provided inside the main body of the game apparatus 3. In this case, transmission data received by the reception module is output via a predetermined bus to the CPU 30.

Although it has been described above that infrared light beams from the two markers 8L and 8R are targets whose images are to be captured by the image capture information computing section 74 of the controller 7, other objects may be targets whose images are to be captured. For example, one or three or more markers may be provided in the vicinity of the monitor 2, and infrared light beams from these markers may be used as targets whose images are to be captured by the image capture information computing section 74. For example, if a single marker having a predetermined length is provided in the vicinity of the monitor 2, and positions of both ends of the length are utilized, the certain exemplary embodiments can be similarly achieved. Alternatively, the display screen itself of the monitor 2 or other light emitting objects (a room lamp, etc.) may be used as targets whose images are to be captured by the image capture information computing section 74. If a position of the controller 7 with respect to the display screen is calculated based on an arrangement relationship between a target whose image is to be captured and the display screen of the monitor 2, various light emitting objects can be used as targets whose images are to be captured by the image capture information computing section 74.

Note that the shape of the controller 7, and the shapes, number, installed positions and the like of the operation sections 72 are only for illustrative purposes, and the certain exemplary embodiments can be achieved with other shapes, number, and installed positions. The position (the light entering opening of the image capture information computing section 35) of the image capture information computing section 74 in the controller 7 may not be on the front surface of the housing 71, and may be provided on other surfaces if light can be taken in from the outside of the housing 71.

Although the game apparatus 3 is operated using the controller 7, or the touch panel 15 is integrated with the hand-held game apparatus 10 in the above-described example, an information processing apparatus, such as a general personal computer or the like, which employs a pointing device as an input means may be used. In this case, a program executed by a computer of the information processing apparatus is not limited to a game program typically used for a game, and may be a general-purpose program in which a selection subject selected by the above-described method is used in a process with respect to the information processing apparatus.

Regarding the storage medium storing the subject selecting program of the certain exemplary embodiments and the subject selecting apparatus of the certain exemplary embodiments, one selection subject can be efficiently selected from a plurality of displayed selection subjects, and therefore, the certain exemplary embodiments are useful as a program and an apparatus for performing a selection process using a pointing device or the like.

While the certain exemplary embodiments have been described in detail, the foregoing description is in all aspects illustrative and not restrictive. It is understood that numerous other modifications and variations can be devised without departing from the scope of the certain exemplary embodiments.

What is claimed is:

1. A non-transitory computer readable storage medium storing a subject selecting program which causes a computer of an apparatus to perform a process of selecting one from a plurality of selection subjects displayed on a display screen using a pointing device for outputting coordinate information by directly designating coordinates on the display screen, the pointing device being configured to remotely designate the coordinates on the display screen without a player's button operation, and an input device for outputting, depending on a player's button operation, an operation signal indicating an operation button that has been operated in the player's button operation, the program causing the computer to execute:
displaying, on the display screen, a plurality of selection subjects which are divided into groups under a predetermined condition;
obtaining coordinate information indicating the position output from the pointing device;
provisionally selecting one from the groups into which the plurality of selection subjects are divided, based on the position output from the pointing device;
assigning operation buttons that are different from each other to selection subjects, respectively, the selection subjects belonging to the one group that has been provisionally selected;
obtaining an operation signal output from the input device;

when the operation signal indicating an operation button that has been operated is obtained in a state where the one group has been provisionally selected, selecting from selection subjects belonging to the provisionally selected group, one selection subject having the operation button assigned thereto that is the operation button that has been indicated as operated by the operation signal; and performing a process, depending on the selected selection subject, wherein an appearance of the selection subjects is changed to indicate a relationship between the assigned operation button and the respective selection subject, in provisionally selecting one from selection subjects belonging to the selected group, one selection subject displayed in a shape or at a position mimicking an installed position of an input section of the input device which outputs the obtained operation signal is selected from the selection subjects belonging to the selected group, and provisionally selecting one from the groups into which the plurality of selection subjects are divided includes changing selection subjects belonging to the selected group into shapes or positions mimicking installed positions of input sections of the input device when a group is selected, and displaying the resultant selection subjects on the display screen.

2. The computer readable storage medium according to claim 1, wherein, in provisionally selecting one from the groups into which the plurality of selection subjects are divided, the coordinate information output from the pointing device is converted into coordinates in a screen coordinate system provided on the display screen, and one group displayed at a position having the coordinates on the display screen is selected from the groups into which the plurality of selection subjects are divided.

3. The computer readable storage medium according to claim 1, wherein provisionally selecting one from the groups into which the plurality of selection subjects are divided includes assigning signs indicating functions assigned to respective input sections of the input device to the respective selection subjects belonging to the selected group when a group is selected, and displaying the selection subjects, and in selecting from selection subjects belonging to the provisionally selected group, one selection subject displayed, being assigned a sign indicating a function assigned to an input section of the input device which outputs the obtained operation signal, is selected from the selection subjects belonging to the selected group.

4. The computer readable storage medium according to claim 1, wherein provisionally selecting one from the groups into which the plurality of selection subjects are divided includes, when a group is selected, displaying selection subjects belonging to the selected group on the display screen while distinguishing the selection subjects belonging to the selected group from the other selection subjects.

5. The computer readable storage medium according to claim 1, wherein the selecting one from selection subjects belonging to the provisionally selected group includes, when a selection subject is selected, displaying the selected selection subject on the display screen while distinguishing the selected selection subject from the other selection subjects.

6. The computer readable storage medium according to claim 1, wherein the subject selecting program causes the computer to further execute:

previously setting the groups to which the plurality of selection subjects belong and corresponding input sections of the input device.

7. The computer readable storage medium according to claim 1, wherein the subject selecting program causes the computer to further execute:

dividing and setting the plurality of selection subjects into groups to each of which a predetermined number of selection subjects belong.

8. The computer readable storage medium according to claim 1, wherein the subject selecting program causes the computer to further execute:

dividing and setting the plurality of selection subjects into groups to each of which selection subjects displayed adjacent to each other on the display screen belong.

9. The computer readable storage medium according to claim 1, wherein the selection subject is an object which is displayed on the display screen and on which a character is written, and in the processing, a process of inputting a character written on an object selected in the selecting one from selection subjects belonging to the selected group is performed.

10. The computer readable storage medium according to claim 1, wherein the selection subject is a character displayed on the display screen, and in the processing, a process of inputting a character selected in the selecting one from selection subjects belonging to the selected group is performed.

11. A subject selecting apparatus for selecting one from a plurality of selection subjects displayed on a display screen using a pointing device for outputting coordinate information by directly designating coordinates on the display screen, the pointing device being configured to remotely designate the coordinates on the display screen without a player's button operation, and an input device for outputting, depending on a player's button operation, an operation signal indicating an operation button that has been operated in the player's button operation, the apparatus comprising:

a processor;

a memory coupled to the processor, the memory storing instructions that, when executed by the processor, control the processor to:

display, on the display screen, a plurality of selection subjects which are divided into groups under a predetermined condition;

obtain coordinate information indicating the position output from the pointing device;

provisionally select one from the groups into which the plurality of selection subjects are divided, based on the obtained position;

assign operation buttons that are different from each other to selection subjects, respectively, the selection subjects belonging to the one group that has been provisionally selected;

obtain an operation signal output from the input device;

when the operation signal indicating an operation button that has been operated is obtained in a state where the one group has been provisionally selected, select from selection subjects belonging to the group provisionally selected, one selection subject having the operation button assigned thereto that is the operation button that has been indicated as operated by the operation signal; and perform a process, depending on the selected selection subject, wherein an appearance of the selection subjects is changed to indicate a relationship between the assigned operation button and the respective selection subject, one selection subject displayed in a shape or at a position mimicking an installed position of an input section of the input device which outputs the operation signal is selected from the selection subjects belonging to the selected group, and when a group is provisionally selected, selection subjects belonging to the provisionally selected group are changed into shapes or positions mimicking installed positions of input sections of the input device, and the resultant selection subjects are displayed on the display screen.

12. The subject selecting apparatus to claim 11, wherein the coordinate information output from the pointing device is converted into coordinates in a screen coordinate system provided on the display screen, and one group displayed at a position having the coordinates on the display screen is selected from the group into which the plurality of selection subjects are divided.

13. The subject selecting apparatus to claim 11, wherein, when a group is provisionally selected, signs indicating functions assigned to respective input sections of the input device are assigned to the respective selection subjects belonging to the provisionally selected group, and one selection subject displayed, being assigned a sign indicating a function assigned to an input section of the input device which outputs the obtained operation signal, is selected from the selection subjects belonging to the selected group.

14. The subject selecting apparatus to claim 11, wherein when a group is provisionally selected, selection subjects belonging to the provisionally selected group are displayed on the display screen while distinguishing the selection subjects belonging to the provisionally selected group from the other selection subjects.

15. The subject selecting apparatus to claim 11, wherein when a selection subject is selected, the selected selection subject is displayed on the display screen while distinguishing the selected selection subject from the other selection subjects.

16. The subject selecting apparatus to claim 11, wherein the processor is further controlled to:
set the groups to which the plurality of selection subjects belong and corresponding input sections of the input device.

17. The subject selecting apparatus to claim 11, wherein the processor is further controlled to:
divide and set the plurality of selection subjects into groups to each of which a predetermined number of selection subjects belong.

18. The subject selecting apparatus to claim 11, wherein the processor is further controlled to:
divide and set the plurality of selection subjects into groups to each of which selection subjects displayed adjacent to each other on the display screen belong.

19. The computer readable storage medium according to claim 1, wherein
in assigning operation buttons, different directions indicated by the respective operation buttons are assigned to the selection subjects belonging to the provisionally selected group, respectively, and
in selecting one from selection subjects, one selection subject having the direction assigned thereto that is the direction indicated by the operated operation button, is selected from the selection subjects belonging to the provisionally selected group.

20. The subject selecting apparatus according to claim 11, wherein in assigning operation buttons, different directions indicated by the respective operation buttons are assigned to the selection subjects belonging to the provisionally selected group, respectively, and
in selecting one from selection subjects, one selection subject having the direction assigned thereto that is the direction indicated by the operated operation button, is selected from the selection subjects belonging to the provisionally selected group.

21. A method of selecting one from a plurality of selection subjects displayed on a display screen using a pointing device for outputting coordinate information by directly designating coordinates on the display screen, the pointing device being configured to remotely designate the coordinates on the display screen without a player's button operation, and an input device for outputting, depending on a player's button operation, an operation signal indicating an operation button that has been operated in the player's button operation, comprising:

displaying, on the display screen, a plurality of selection subjects which are divided into groups under a predetermined condition;
obtaining coordinate information indicating the position output from the pointing device;
provisionally selecting one from the groups into which the plurality of selection subjects are divided, based on the position output from the pointing device;
assigning operation buttons that are different from each other to selection subjects, respectively, the selection subjects belonging to the one group that has been provisionally selected;
obtaining an operation signal output from the input device;
when the operation signal indicating an operation button that has been operated is obtained in a state where the one group has been provisionally selected, selecting from selection subjects belonging to the provisionally selected group, one selection subject having the operation button assigned thereto that is the operation button that has been indicated as operated by the operation signal; and
performing a process, depending on the selected selection subject, wherein
an appearance of the selection subjects is changed to indicate a relationship between the assigned operation button and the respective selection subject,
in provisionally selecting one from selection subjects belonging to the selected group, one selection subject displayed in a shape or at a position mimicking an installed position of an input section of the input device which outputs the obtained operation signal, is selected from the selection subjects belonging to the selected group, and
provisionally selecting one from the groups into which the plurality of selection subjects are divided includes changing selection subjects belonging to the selected group into shapes or positions mimicking installed positions of input sections of the input device when a group is selected, and displaying the resultant selection subjects on the display screen.

22. A non-transitory computer readable storage medium storing a subject selecting program which causes a computer of an apparatus to performing a process of causing a player to select one from a plurality of selection subjects displayed on a display screen by using: a pointing device for outputting coordinate information by directly designating coordinates on the display screen, the pointing device being configured to remotely designate the coordinates on the display screen without a player's button operation; and an input device for outputting a predetermined operation signal of a plurality of types of operation signals, the program causing the computer to perform:
displaying a plurality of selection subjects which are divided into groups under a predetermined condition, in designation areas on the display screen that are set for the respective groups;
obtaining coordinate information output from the pointing device;
selecting, from the groups into which the plurality of selection subjects are divided, one group corresponding to the designation area including the obtained coordinate information;
obtaining an operation signal output from the input device;
selecting one selection subject corresponding to the operation signal, from selection subjects belonging to the selected group selected, when the operation signal is obtained in a state where one of the groups is selected; and
performing a process, depending on the selected selection subject.

23. A subject selecting apparatus for selecting one from a plurality of selection subjects displayed on a display screen using: a pointing device for outputting coordinate information by directly designating coordinates on the display screen, the pointing device being configured to remotely designate the coordinates on the display screen without a player's button operation; and an input device for outputting a predetermined operation signal of a plurality of types of operation signals, comprising:
a processor;
a memory coupled to the processor, the memory storing instructions that, when executed by the processor, control the processor to: display a plurality of selection subjects which are divided into groups under a predetermined condition, in designation areas on the display screen that are set for the respective groups;
obtain coordinate information output from the pointing device;
select, from the groups into which the plurality of selection subjects are divided, one group corresponding to the designation area including the obtained coordinate information;
obtain an operation signal output from the input device;
select one selection subject corresponding to the operation signal, from selection subjects belonging to the group selected by the group selector, when the operation signal is obtained in a state where one of the groups is selected; and
perform a process, depending on the selection subject selected by the subject selector.

24. A method of causing a player to select one from a plurality of selection subjects displayed on a display screen by using: a pointing device for outputting coordinate information by directly designating coordinates on the display screen, the pointing device being configured to remotely designate the coordinates on the display screen without a player's button operation; and an input device for outputting a predetermined operation signal of a plurality of types of operation signals, comprising:
displaying a plurality of selection subjects which are divided into groups under a predetermined condition, in designation areas on the display screen that are set for the respective groups;
obtaining coordinate information output from the pointing device;
selecting, from the groups into which the plurality of selection subjects are divided, one group corresponding to the designation area including the obtained coordinate information;
obtaining an operation signal output from the input device;
selecting one selection subject corresponding to the operation signal, from selection subjects belonging to the selected group, when the operation signal is obtained in a state where one of the groups is selected; and
performing a process, depending on the selected selection subject.

25. A system for selecting one from a plurality of selection subjects displayed on a display screen using a pointing device for outputting coordinate information by directly designating coordinates on the display screen, the pointing device being configured to remotely designate the coordinates on the display screen without a player's button operation, and an input device for outputting, depending on a player's button operation, an operation signal indicating an operation button that has been operated in the player's button operation, the apparatus comprising:
a controller; and
a processing system including one or more processors, the processing system configured to:
display, on the display screen, a plurality of selection subjects which are divided into groups under a predetermined condition,
obtain coordinate information indicating the position output from the pointing device,
provisionally select one from the groups into which the plurality of selection subjects are divided, based on the obtained position,
assign operation buttons that are different from each other to selection subjects, respectively, the selection subjects belonging to the one group that has been provisionally selected,
obtain an operation signal output from the input device,
when the operation signal indicating an operation button that has been operated is obtained in a state where the one group has been provisionally selected, select from selection subjects belonging to the group provisionally selected, one selection subject having the operation button assigned thereto that is the operation button that has been indicated as operated by the operation signal, and
perform a process, depending on the selected selection subject, wherein
an appearance of the selection subjects is changed to indicate a relationship between the assigned operation button and the respective selection subject,
one selection subject displayed in a shape or at a position mimicking an installed position of an input section of the input device which outputs the operation signal is selected from the selection subjects belonging to the selected group, and
when a group is provisionally selected, selection subjects belonging to the provisionally selected group are changed into shapes or positions mimicking installed positions of input sections of the input device, and the resultant selection subjects are displayed on the display screen.

26. A system for receiving input from a player to select one from a plurality of selection subjects displayed on a display screen by using: a pointing device for outputting coordinate information by directly designating coordinates on the display screen, the pointing device being configured to remotely designate the coordinates on the display screen without a player's button operation; and an input device for outputting a predetermined operation signal of a plurality of types of operation signals, the system comprising:
- a controller; and
- a processing system one or more processors, the processing system configured to:
- display a plurality of selection subjects which are divided into groups under a predetermined condition, in designation areas on the display screen that are set for the respective groups,
- obtain coordinate information output from the pointing device;
- select, from the groups into which the plurality of selection subjects are divided, one group corresponding to the designation area including the obtained coordinate information,
- obtain an operation signal output from the input device,
- select one selection subject corresponding to the operation signal, from selection subjects belonging to the selected group selected, when the operation signal is obtained in a state where one of the groups is selected, and
- perform a process depending on the selected selection subject.

* * * * *